(12) United States Patent
Kumashio

(10) Patent No.: US 9,509,731 B2
(45) Date of Patent: Nov. 29, 2016

(54) INFORMATION PROCESSING APPARATUS, INFORMATION PROCESSING SYSTEM, AND INFORMATION DISPLAY METHOD

(71) Applicant: Hiroya Kumashio, Chiba (JP)

(72) Inventor: Hiroya Kumashio, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 194 days.

(21) Appl. No.: 14/277,168

(22) Filed: May 14, 2014

(65) Prior Publication Data

US 2014/0344720 A1 Nov. 20, 2014

(30) Foreign Application Priority Data

May 17, 2013 (JP) .................... 2013-104906

(51) Int. Cl.
H04L 29/06 (2006.01)
H04N 7/15 (2006.01)
H04L 12/18 (2006.01)

(52) U.S. Cl.
CPC ....... H04L 65/4023 (2013.01); H04L 12/1827 (2013.01); H04L 65/403 (2013.01); H04L 65/4038 (2013.01); H04N 7/15 (2013.01)

(58) Field of Classification Search
CPC .................................................. H04L 65/403
USPC ....................................................... 715/753
See application file for complete search history.

(56) References Cited

U.S. PATENT DOCUMENTS

| | | | | |
|---|---|---|---|---|
| 6,384,815 B1 * | 5/2002 | Huang | ............... | G06F 17/242 |
| | | | | 178/18.03 |
| 7,356,563 B1 * | 4/2008 | Leichtling | ............ | G06Q 10/06 |
| | | | | 345/2.1 |
| 2006/0036692 A1 * | 2/2006 | Morinigo | ............ | G06Q 10/107 |
| | | | | 709/206 |
| 2011/0169858 A1 | 7/2011 | Sakaguchi | | |
| 2012/0323999 A1 * | 12/2012 | Pearson | ................ | G06Q 10/10 |
| | | | | 709/204 |
| 2013/0086487 A1 * | 4/2013 | Findlay | .................... | H04N 7/15 |
| | | | | 715/753 |
| 2013/0339459 A1 | 12/2013 | Kumashio | | |
| 2014/0063174 A1 * | 3/2014 | Junuzovic | ........... | G06Q 10/101 |
| | | | | 348/14.02 |
| 2014/0074930 A1 | 3/2014 | Kumashio | | |
| 2014/0292999 A1 * | 10/2014 | Do | ....................... | H04L 65/608 |
| | | | | 348/14.07 |

FOREIGN PATENT DOCUMENTS

| | | |
|---|---|---|
| JP | 2004-072428 | 3/2004 |
| JP | 2011-141835 | 7/2011 |
| JP | 2011-253306 | 12/2011 |

* cited by examiner

*Primary Examiner* — Doon Chow
*Assistant Examiner* — Conrad Pack
(74) *Attorney, Agent, or Firm* — IPUSA, PLLC

(57) ABSTRACT

An information processing apparatus is provided that shares an operation on content with another information processing apparatus. The information processing apparatus includes a drawing unit that draws information on the content based on a drawing operation accepted from an operator for drawing the information on the content, a generation unit that generates data for drawing the information on the content that is being displayed at the other information processing apparatus based on the drawing operation, and a transmission unit that transmits to the other information processing apparatus a message including the data for drawing the information and a command according to the drawing operation. Based on the drawing operation, the generation unit generates data for continuously displaying the information on the content being displayed at the other information processing apparatus, or data for deleting the information after a duration time elapses.

11 Claims, 16 Drawing Sheets

FIG.4

| ITEM NAME | DESCRIPTION |
|---|---|
| CONFERENCE ID | ID FOR UNIQUELY IDENTIFYING CONFERENCE, SET BY CONFERENCE SERVER WHEN CREATING CONFERENCE |
| CONFERENCE NAME | NAME USED BY USER FOR IDENTIFYING CONFERENCE |
| CONFERENCE DATE/TIME | SCHEDULED START TIME OF CONFERENCE |
| PASSWORD | WHEN THIS VALUE IS SET, THIS PASSWORD NEEDS TO BE INPUT WHEN HOLDING A CONFERENCE OR ATTENDING A CONFERENCE THAT IS BEING HELD<br>ALSO, THIS PASSWORD NEEDS TO BE INPUT WHEN DOWNLOADING CONFERENCE MATERIAL |
| AUTHORIZATION TO DOWNLOAD CONFERENCE MATERIAL | FLAG INDICATING WHETHER USER IS AUTHORIZED TO DOWNLOAD CONFERENCE MATERIAL AFTER CONFERENCE (TRUE/FALSE) |
| AUTHORIZATION TO CHANGE PRESENTER | FLAG INDICATING WHETHER PRESENTER CAN BE CHANGED DURING CONFERENCE (TRUE/FALSE) |
| CONFERENCE STATUS | VALUE REPRESENTING ONE OF THE FOLLOWING THREE STATUSES: BEFORE CONFERENCE, DURING CONFERENCE, AND AFTER CONFERENCE CHANGED BY CONFERENCE SERVER ACCORDING TO CURRENT STATUS |
| CONFERENCE MATERIAL | BINARY DATA OF CONFERENCE MATERIAL |

FIG.5

| INSTRUCTION | DESCRIPTION |
|---|---|
| CREATE CONFERENCE | [REQUEST MESSAGE]<br>    \<iq id="ID" to="DOMAIN" type="set"\><br>        \<createnewconference\><br>            \<conference_name\>CONFERENCE NAME\</conference_name\><br>            \<startdate\>CONFERENCE DATE/TIME\</startdate\><br>            \<pwd\>PASSWORD\</pwd\><br>            \<removalflag\>AUTHORIZATION TO DOWNLOAD CONFERENCE MATERIAL\</removalflag\><br>            \<presenter_lock\>AUTHORIZATION TO CHANGE PRESENTER\</presenter_lock\><br>        \</createnewconference\><br>    \</iq\><br><br>[DESCRIPTION]<br>FOR EACH PASSWORD, WHEN THERE IS NO ITEM, IT MEANS THERE IS NO PASSWORD |
| | [RESPONSE MESSAGE]<br>    \<iq type="result" id="ID" from="DOMAIN" to="USER JID"/\><br>        \<createnewconference\><br>            \<conference_id\>CONFERENCE ID\</conference_id\><br>        \</createnewconference\><br>    \</iq\><br><br>[DESCRIPTION]<br>CREATED CONFERENCE ID IS RETURNED |
| EDIT CONFERENCE | [REQUEST MESSAGE]<br>    \<iq id="ID" to="DOMAIN" type="set"\><br>        \<savechangeconferencedata\><br>            \<conference_id\>CONFERENCE ID\</conference_id\><br>            \<conference_name\>CONFERENCE NAME\</conference_name\><br>            \<startdate\>CONFERENCE DATE/TIME\</startdate\><br>            \<pwd\>PASSWORD\</pwd\><br>            \<removalflag\>AUTHORIZATION TO DOWNLOAD CONFERENCE MATERIAL\</removalflag\><br>            \<presenter_lock\>AUTHORIZATION TO CHANGE PRESENTER\</presenter_lock\><br>        \</savechangeconferencedata\><br>    \</iq\><br><br>[DESCRIPTION]<br>SPECIFY CONFERENCE ID OF CONFERENCE TO BE CHANGED; ONLY EXISTING ITEMS CAN BE CHANGED |
| | [RESPONSE MESSAGE]<br>    \<iq type="result" id="ID" from="DOMAIN" to="USER JID"/\><br>        \<savechangeconferencedata/\><br>    \</iq\> |
| DELETE CONFERENCE | [REQUEST MESSAGE]<br>    \<iq id="ID" to="DOMAIN" type="set"\><br>        \<deleteconference\><br>            CONFERENCE ID<br>        \</deleteconference\><br>    \</iq\> |
| | [RESPONSE MESSAGE]<br>    \<iq type="result" id="ID" from="DOMAIN" to="USER JID"/\><br>        \<deleteconference /\><br>    \</iq\> |

FIG.6

| INSTRUCTION | DESCRIPTION |
|---|---|
| SEARCH CONFERENCE INFORMATION | [REQUEST MESSAGE]<br><iq id="ID" to="DOMAIN" type="get"><br>    <getconferencelist><br>        <searchcondition><br>           <day>CONFERENCE DATE/TIME</day><br>           <status>STATUS</status><br>           <keyword>KEYWORD</keyword><br>           <conference_id>CONFERENCE ID</conference_id><br>        </searchcondition><br>    </getconferencelist><br></iq><br><br>[DESCRIPTION]<br>REFINE SEARCH OBJECT BY searchcondition<br>-CONFERENCE DATE/TIME: REFINE BY CONFERENCE DATE/TIME<br>-STATUS: REFINE BY CONFERENCE STATUS; OR SEARCH CAN BE PERFORMED BY SEPARATING BY HALF SIZE SPACE<br>-KEYWORD: REFINE BY KEYWORD; SEARCH OBJECTS ARE CONFERENCE ID AND CONFERENCE NAME; OR SEARCH CAN BE PERFORMED BY SEPARATING BY HALF SIZE SPACE<br>-CONFERENCE ID: SPECIFY CONFERENCE ID AND USE WHEN ACQUIRING LIST; SEPARATE BY HALF SIZE SPACE WHEN MAKING MULTIPLE REQUESTS |
| | [RESPONSE MESSAGE]<br><iq type="result" id="ID" from="DOMAIN" to="USER JID"/><br>    <getconferencelist xmlns="http://AAA.com/saurel/getconferencelist"><br>        <listitems>NUMBER OF SEARCH RESULTS<br>           <listitem><br>               <conference_id>CONFERENCE ID</conference_id><br>               <conference_name>CONFERENCE NAME</conference_name><br>               <startdate>CONFERENCE DATE/TIME</startdate><br>               <pwdflag>WHETHER THERE IS PASSWORD</pwdflag><br>               <removalflag>AUTHORIZATION TO DOWNLOAD CONFERENCE MATERIAL</removalflag><br>               <presenter_lock>AUTHORIZATION TO CHANGE PRESENTER</presenter_lock><br>               <conference_status>CONFERENCE STATUS</conference_status><br>           </listitem><br>           <listitem><br>               (REPEAT)<br>           </listitem><br>        </listitems><br>    </getconferencelist><br></iq> |
| HOLD/ ATTEND CONFERENCE | [REQUEST MESSAGE]<br><presence to="CONFERENCE USER JID" id="ID"><br>    <x><br>        <pwd>PASSWORD</pwd><br>    </x><br></presence><br><br>[RESPONSE MESSAGE]<br><presence from="CONFERENCE USER JID" to="USER JID" id="ID"><br>    <x><br>        <status code="STATUS"/><br>    </x><br></presence><br><br>[DESCRIPTION]<br>STATUS IS 201 IF SUCCESSFUL AND 501 IF UNSUCCESSFUL |

FIG.7

| INSTRUCTION | DESCRIPTION |
|---|---|
| EXIT CONFERENCE | [REQUEST MESSAGE]<br>    <presence to="CONFERENCE USER JID" id="ID" type="unavailable"/><br><br>[RESPONSE MESSAGE]<br>    <presence from="CONFERENCE USER JID" to="USER JID" id="ID" type=" unavailable" /> |
| ACQUIRE MATERIAL URL | [REQUEST MESSAGE]<br>    <iq to="CONFERENCE JID" id="ID" type="get" class="RequestDownloadURL" operation="update"><br>        <body>REQUESTCOMMAND_DOWNLOADURL</body><br>    </iq><br><br>[DESCRIPTION]<br><br>[RESPONSE MESSAGE]<br>    <iq from="CONFERENCE JID" to="USER JID" id="ID" type="result" class="RequestDownloadURL" operation="update"><br>        <body> [DOCUMENT ID][MATERIAL URL] </body><br>    </iq><br><br>[DESCRIPTION] |
| ADD MATERIAL URL | [REQUEST MESSAGE]<br>    <iq to="CONFERENCE JID" id="ID" type="set" class="RequestAddDocument " operation="update"><br>        <body>MATERIAL URL </body><br>    </iq><br><br>[DESCRIPTION]<br><br>[RESPONSE MESSAGE]<br>    <iq from="CONFERENCE JID" to="USER JID" id="ID" type="result" class=" RequestAddDocument " operation="update"><br>        <body>STATUS</body><br>    </iq><br><br>[DESCRIPTION]<br>STATUS IS "OK" IF SUCCESSFUL AND "NG" IF UNSUCCESSFUL |

FIG.8

| MESSAGE TYPE | DATA FORMAT |
|---|---|
| SPECIFY DISPLAY PAGE | `<message type="groupchat", from="XXXX", to="YYYY">`<br>`<body>`<br>`<conference operation="update">`<br>   `2`<br>`</conference>`<br>`</body>`<br>`</message>` |
| ADD FIGURE | `<message type="groupchat", from="XXXX", to="YYYY">`<br>`<body>`<br>`<conference operation="add">`<br>   `<autoshape id="as1" x=100 y=100>`<br>     `<svg>`<br>     ....<br>     `</svg>`<br>   `</autoshape>`<br>`</conference>`<br>`</message>` |
| DELETE FIGURE | `<message type="groupchat", from="XXXX", to="YYYY">`<br>`<body>`<br>`<conference operation="delete">`<br>   `<autoshape id="as1"></autoshape>`<br>`</conference>`<br>`</message>` |
| UPDATE HANDWRITTEN NOTES | `<message type="groupchat", from="XXXX", to="YYYY">`<br>`<body>`<br>`<conference operation="update">`<br>   `<ink>`<br>   ....<br>   `</ink>`<br>`</conference>`<br>`</body>`<br>`</message>` |
| TRACE DISPLAY | `<message type="groupchat", from="XXXX", to="YYYY">`<br>`<body>`<br>`<conference operation="update">`<br>   `<duration time>5</duration time>`<br>   `<ink>`<br>   ....<br>   `</ink>`<br>`</conference>`<br>`</body>`<br>`</message>` |

INFORMATION PROCESSING APPARATUS, INFORMATION PROCESSING SYSTEM, AND INFORMATION DISPLAY METHOD

BACKGROUND OF THE INVENTION

1. Field of the Invention

The present invention relates to an information processing apparatus, an information processing system, and an information display method.

2. Description of the Related Art

Input/output apparatuses are known that are configured to display data, accept handwritten traces, and display the handwritten traces on the data being displayed (see e.g. Japanese Laid-Open Patent Publication No. 2011-141835).

In a typical input/output apparatus, while handwritten traces are displayed at a display unit, if a next trace is not subsequently input within a predetermined time period, the display unit ceases to display the previously input traces, and in this way, unnecessary traces are automatically deleted.

SUMMARY OF THE INVENTION

According to one embodiment of the present invention, an information processing apparatus is provided that shares an operation on content with another information processing apparatus. The information processing apparatus includes a drawing unit that draws information on the content that is being displayed based on a drawing operation accepted from an operator for drawing the information on the content, a generation unit that generates data for drawing the information accepted from the operator on the content that is being displayed at the other information processing apparatus based on the drawing operation accepted from the operator, and a transmission unit that transmits to the other information processing apparatus a message including the data for drawing the information and a command according to the drawing operation accepted from the operator. Based on the drawing operation accepted from the operator for drawing the information on the content, the generation unit generates data for continuously displaying the information accepted from the operator on the content that is being displayed at the other information processing apparatus, or data for deleting the information accepted from the operator after a duration time elapses.

According to an aspect of the present invention, the information processing apparatus may be capable of handling both information that is to be continuously displayed and information that is to be automatically deleted after a certain duration time.

BRIEF DESCRIPTION OF THE DRAWINGS

FIG. 4 illustrates an exemplary configuration of conference information;

FIG. 5 illustrates examples of instructions prepared in a conference server;

FIG. 6 illustrates examples of instructions prepared in a conference server;

FIG. 7 illustrates examples of instructions prepared in a conference server;

FIG. 8 illustrates examples of XMPP messages;

DESCRIPTION OF THE PREFERRED EMBODIMENTS

In an information processing system configured to accept information input by a user to be displayed on content, there may be cases where the user wishes to continue displaying the input information and cases where the user wishes to have the input information automatically deleted after a predetermined time period elapses. However, it has been rather difficult to enable an information processing system to handle both information the user wishes to continue displaying and information the user wishes to have automatically deleted after a predetermined time period elapses.

In light of the above, an aspect of the present invention relates to an information processing apparatus, an information processing system, and an information display method that can handle both information that is to be continually displayed and information that is to be automatically deleted.

In the following, embodiments of the present invention are described with reference to the accompanying drawings. Note that a conference system is described below as an exemplary embodiment of an information processing system.

[First Embodiment]

<System Configuration>

Figure 1:
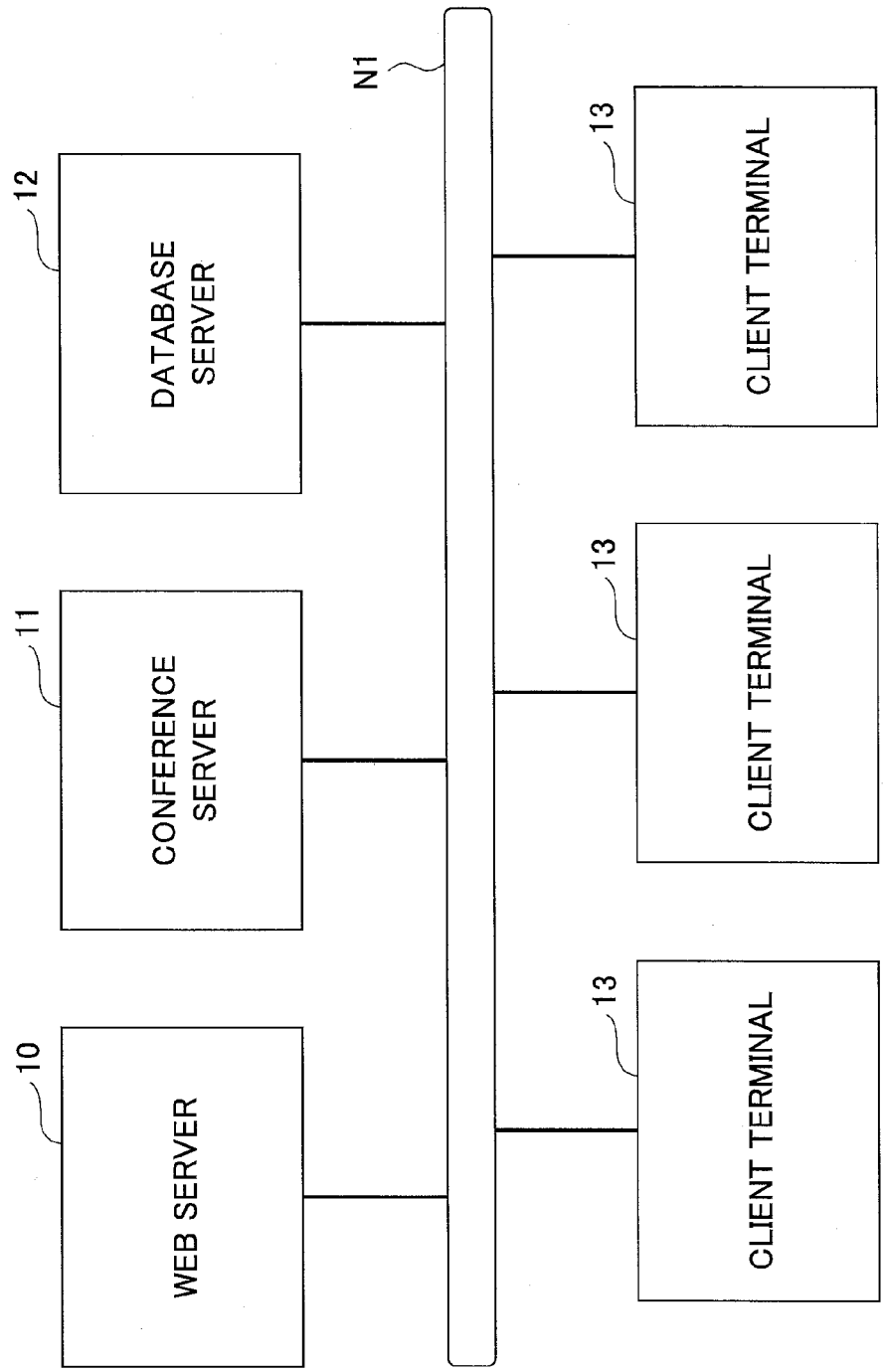
FIG. 1 illustrates an exemplary configuration of a conference system according to an embodiment of the present invention.

FIG. 1 illustrates an exemplary configuration of a conference system 1 according to an embodiment of the present invention. The conference system 1 illustrated in FIG. 1 includes a web server 10, a conference server 11, a database server 12, and a plurality of client terminals 13, which are connected to a network N1 such as a LAN (Local Area Network).

The web server 10, the conference server 11, and the database server 12 may be software and services that are run on separate computers, or software and services that are run on a single computer. Furthermore, the web server 10, the conference server 11, and the database server 12 may be implemented by the so called cloud services.

The web server 10 stores information such as HTML documents and CSS (Cascading Style Sheets) files accompanying the HTML documents, JavaScript (registered trademark) files, and image files. A JavaScript file is an example of a file described in a script language (simplified programming language). The web server 10 is software having a function of delivering information from the WWW (World Wide Web). The web server 10 may be implemented by, for example, free software such as Apache HTTP Server or IIS (Internet Information Services) provided by Microsoft.

The conference server 11 performs conference management of a paperless conference system (e.g. creating, editing, deleting, and searching a conference; and performing necessary communications with the client terminals 13 during the conference). The conference server 11 is software configured to provide services for establishing real-time communications through the network N1. The conference server 11 may be implemented by, for example, NET Messenger Service provided by Microsoft or XMPP (Extensible Messaging and Presence Protocol) [RFC3920], [RFC3921].

The database server 12 stores registered conference information and conference materials. A conference material is an example of contents. The database server 12 may be implemented by a relational database in SQL (Structured Query Language), for example.

The client terminal 13 is a terminal device operated by a user. The client terminals 13 may include, for example, a desktop PC, a notebook PC, a tablet PC, a smartphone, a mobile phone, a projector, and an electronic blackboard. The client terminal 13 can access the web server 10 and the conference server 11.

<Hardware Configuration>

Figure 2:
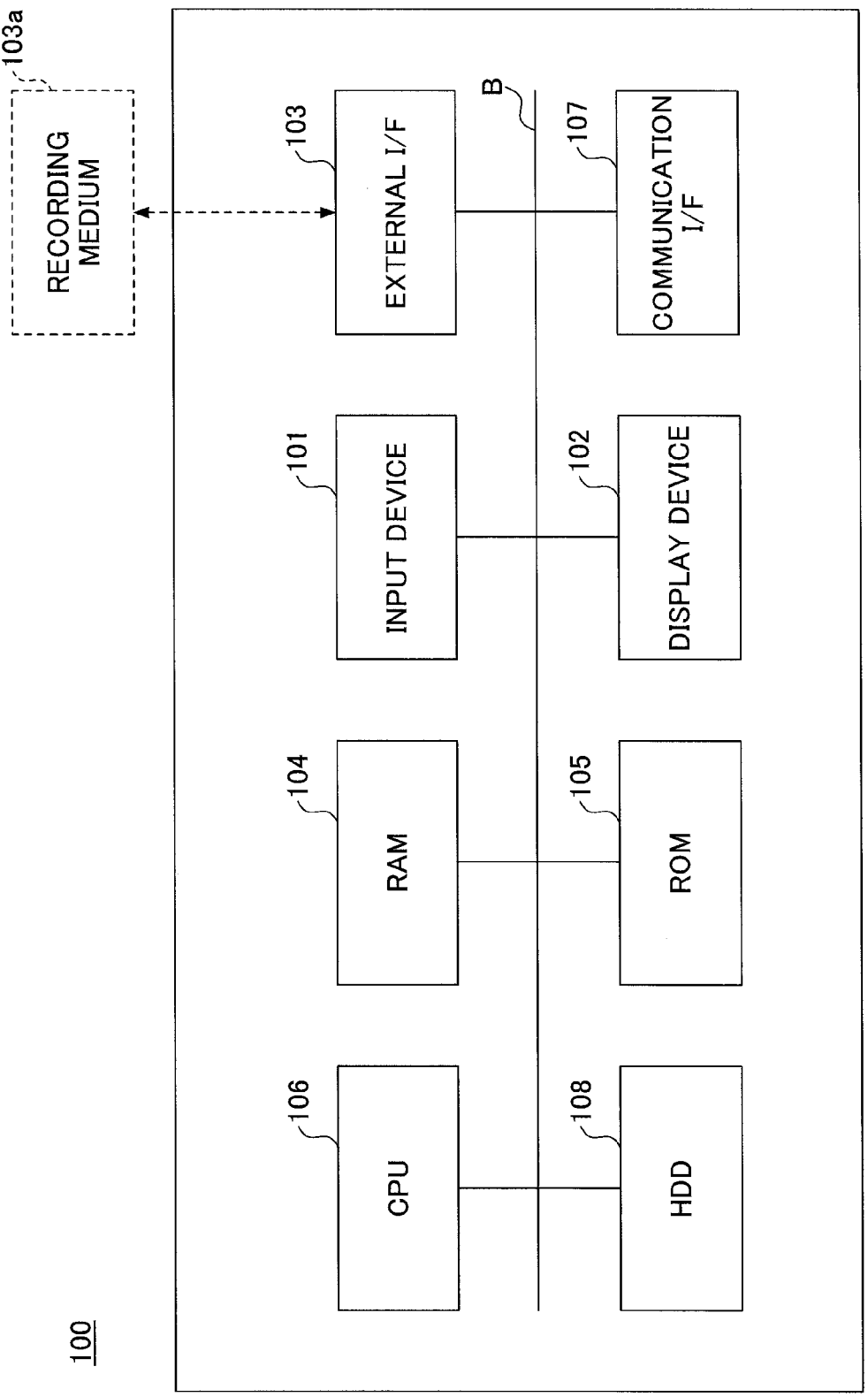
FIG. 2 illustrates an exemplary hardware configuration of a computer according to an embodiment of the present invention.

The web server 10, the conference server 11, the database server 12, and the client terminals 13 may be implemented by a computer 100 having a hardware configuration as illustrated in FIG. 2, for example.

FIG. 2 illustrates an exemplary hardware configuration of the computer 100 according to an embodiment of the present invention. The computer 100 illustrated in FIG. 2 includes an input device 101, a display device 102, an external I/F 103, a RAM (Random Access Memory) 104, a ROM (Read Only Memory) 105, a CPU (Central Processing Unit) 106, a communication I/F 107, and a HDD (Hard Disk Drive) 108, which are interconnected by a bus B.

The input device 101 may include a keyboard and a mouse, for example, and is used for inputting various operation signals in the computer 100. The display device 102 includes a display, and displays processing results of the computer 100.

The communication I/F 107 is an interface for connecting the computer 100 to the network N1. Accordingly, the computer 100 may establish data communication with another computer 100 via the communication I/F 107.

The HDD 108 is a non-volatile storage device storing programs and data. The stored programs and data include an OS (Operating System) corresponding to basic software controlling overall operations of the computer 100, and application software providing various functions on the OS. Furthermore, the HDD 108 manages the stored programs and data by a predetermined file system and/or a DB (Database).

The external I/F 103 is an interface between the computer 100 and an external device. An example of the external device is a recording medium 103*a*. Accordingly, the computer 100 can read information from and/or write information on the recording medium 103*a* via the external I/F 103. Examples of the recording medium 103*a* are a flexible disk, a CD (Compact Disk), a DVD (Digital Versatile Disk), a SD memory card, and a USB memory (Universal Serial Bus memory).

The ROM 105 is a non-volatile semiconductor memory (storage device) that can retain programs and data even after the power is turned off. The ROM 105 stores programs and data such as BIOS (Basic Input/Output System) executed when the computer 100 is activated, OS settings, and network settings. The RAM 104 is a volatile semiconductor memory (storage device) for temporarily holding programs and data.

The CPU 106 is a processor for controlling overall operations of the computer 100 and implementing various functions of the computer 100 by loading relevant programs and data in the RAM 104 from storage devices such as the ROM 105 and the HDD 108, and executing processes according to the loaded programs and data.

The web server 10, the conference server 11, the database server 12, and the client terminals 13 may execute programs in the computer 100 having the above-described hardware configuration to implement various processes as described below, for example.

<Process Operations>

In the following, exemplary process operations executed in the conference system 1 according to the present embodiment are described. Note that the process operations described below are implemented in an exemplary case where the conference server 11 of the conference system 1 uses an instant messenger using XMPP to communicate with the client terminals 13.

Figure 3:
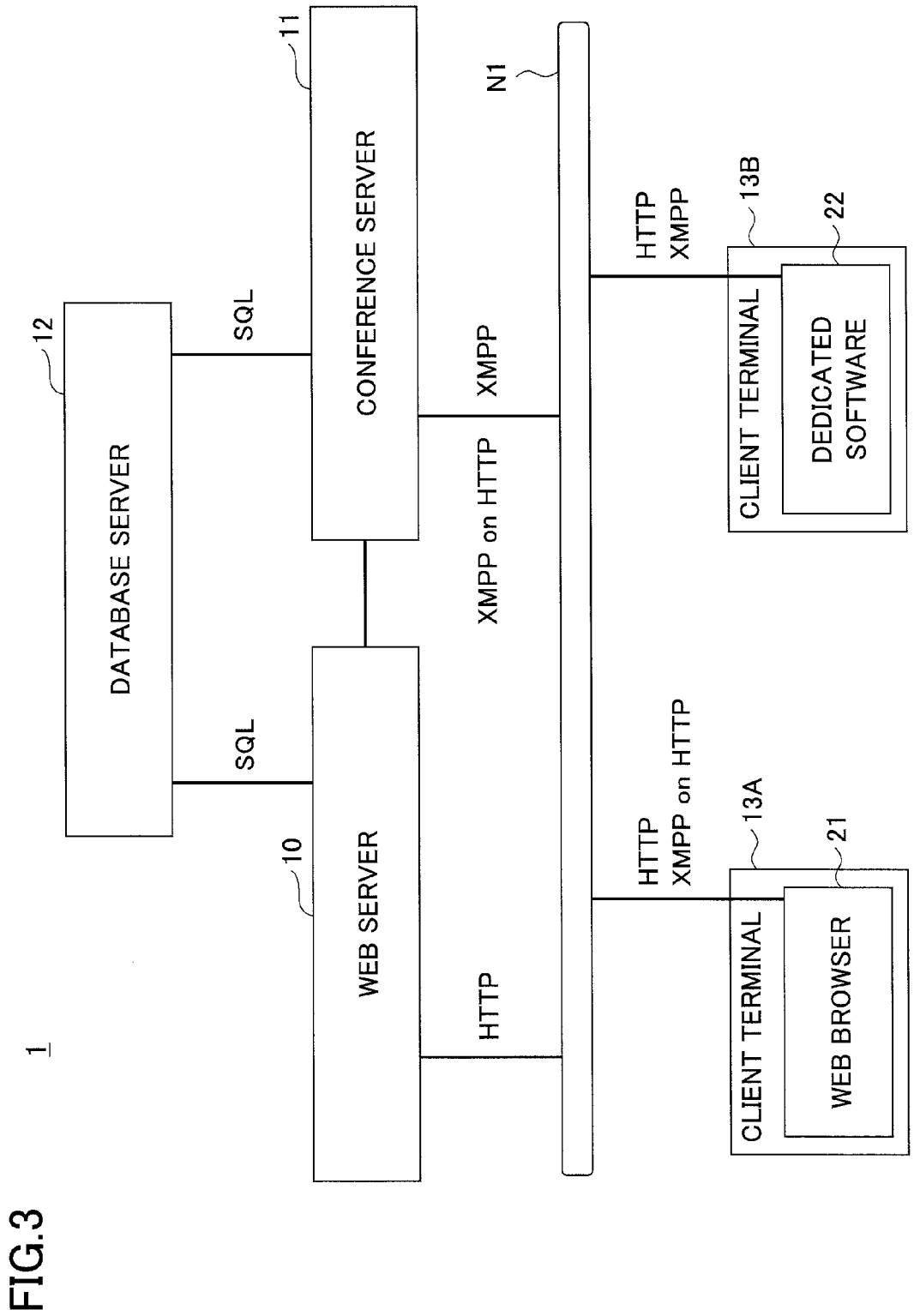
FIG. 3 illustrates an exemplary configuration of the conference system using XMPP.

FIG. 3 illustrates an exemplary configuration of the conference system 1 using XMPP. The conference system 1 illustrated in FIG. 3 includes the web server 10, the conference server 11, and client terminals 13A and 13B, which are connected to the network N1. The web server 10 and the conference server 11 are connected to the database server 12. Furthermore, in the client terminal 13A, a web browser 21 is installed. In the client terminal 13B, dedicated software 22 is installed. Note that the client terminals 13A and 13B may collectively be referred to as "client terminals 13".

XMPP is standardized at IETF as RFC3920 (Extensible Messaging and Presence Protocol: Core), RFC3921 (Extensible Messaging and Presence Protocol: Instant Messaging and Presence), and the extended specifications are documented as XEP.

With XMPP, a service referred to as group chat (Multi-User Chat [XEP-0045]) can be provided. Group chat provides a service whereby a message sent to the conference server 11 from the client terminal 13 attending a conference room (room) provided by XMPP is distributed to all client terminals 13 attending the conference room from the conference server 11.

In XMPP, there is technology referred to as BOSH (Bidirectional-streams Over Synchronous HTTP)[XEP-0206] for transmitting and receiving messages by HTTP. By using BOSH, the conference server 11 may not only perform XMPP communications by HTTP, but may also realize a Push function that is not usually provided. The Push function does not send information upon receiving a request from the client terminal 13; the Push function is for sending information in a non-synchronous manner from the conference server 11 to the client terminals 13, and receiving the information at the client terminals 13. In this specification, the operation of performing XMPP communications by HTTP is expressed as XMPP on HTTP. Actually, XMPP transmits and receives XML (Extensible Markup Language) data. In XMPP on HTTP, XML data of XMPP is transmitted and received by HTTP. In BOSH, a special proxy referred to as CM (Connection Manager) is introduced.

Note that an illustration of the CM is omitted in FIG. 3. The CM exchanges XML data with the conference server 11 using normal XMPP. Furthermore, CM exchanges wrapped XML data of XMPP by HTTP with the web server 10 corresponding to a HTTP client. Note that the client terminal 13A communicates with the conference server 11 by XMPP on HTTP. The client terminal 13B directly communicates with the conference server 11 using XMPP messages.

The conference server 11 has a conference management function. In response to a request to create a conference, an editing request, and a deletion request from the client terminals 13, the conference server 11 applies the conference information in the database server 12 using SQL. The conference information includes information on the status of a conference such as before conference, during conference, and after conference, for example.

Furthermore, the conference server 11 processes requests for opening, attending, leaving, and ending a conference, from the client terminal 13. During a conference, the conference server 11 manages and controls shared conference information (e.g. conference material information, display page of conference material, and handwritten notes). After the conference, the conference server 11 performs download management of the conference material. A request from the client terminal 13 to the conference server 11 is made by a message using XMPP.

The web server 10 stores HTML files (HTML documents) displayed by the web browser 21 installed in the client terminal 13A, CSS files attached to the HTML files, JavaScript files, and image files. A URL (Uniform Resource Locator) is used to specify the web server 10 and a HTML file from the web browser 21.

Furthermore, in the conference system 1, Ajax (Asynchronous JavaScript XML) technology is used to operate DOM (Document Object Model) and overwrite content displayed by the web browser 21. The Ajax technology implements a process by using a HTTP communication function of a JavaScript file to exchange XML data without reloading the web page.

The method of overwriting the content displayed by the web browser 21 is not limited to the method of updating DOM. For example, with "HTML5", the content displayed by the web browser 21 may be directly overwritten.

In the conference system 1, the web server 10 is used to enable the web browser 21 of the client terminal 13A to communicate with the conference server 11. Furthermore, as means for uploading and downloading conference materials, XMPP messages are inappropriate for communicating binary data having a large size. Thus, the conference system 1 uses a GET request and a POST request of HTTP to upload and download conference material.

Conference materials are stored in the database server 12 according to requests to save (upload) the conference materials sent from the client terminal 13 to the conference server 11. Furthermore, when downloading conference materials, the client terminal 13 acquires, from the conference server 11, a URL (material URL) specifying the web server 10 and the conference material. The client terminal 13 uses the acquired material URL to access the web server 10, and downloads the conference material by a HTTP GET/POST request. The web server 10 acquires the conference material from the database server 12 using SQL and sends the conference material to the client terminal 13 as a response to the HTTP GET/POST request.

Furthermore, the conference system 1 creates XML data using JavaScript according to a selection of a conference material to be displayed on the client terminal 13, the display page of the conference material, the text and figures to be rendered on the displayed conference material, and user input (operation) such as handwritten notes, for example. The conference system 1 then sends the XML data by group chat to the conference server 11 using XMPP on HTTP.

The conference server 11 distributes XML data to all client terminals 13 attending the conference room using XMPP or XMPP on HTTP. The client terminal 13A interprets the XML data by JavaScript and operates DOM to update the display of the conference material to be displayed, the display page of the conference material, the text and figures to be rendered on the displayed conference material, and handwritten notes.

The client terminal 13B interprets the XML data using the dedicated software 22 and updates the display of the conference material, the display page of the conference material, the text and figures to be rendered on the displayed conference material, and handwritten notes.

FIG. 4 illustrates an exemplary configuration of conference information. The conference information illustrated in FIG. 4 includes items such as a conference ID, a conference name, a conference date/time, a password, authorization to download conference material, authorization to change presenter, conference status, and conference material.

The conference ID is information for uniquely identifying a conference. The conference ID may be automatically set by the conference server 11 to be a unique ID, in response to a request to create a conference from the client terminal 13, for example. A conference name is arbitrarily set by the user, and is used by the user for identifying a conference. A conference date/time is arbitrarily set by the user. For example, the scheduled start time of the conference may be set as the conference date/time and used by the user for identifying a conference.

A password is information used for attending the conference and downloading the conference material. When a password is set, the user cannot attend the conference unless the user knows the password. Furthermore, when a password is set, the user cannot download the conference material unless the user knows the password. When a password is not set, the user can freely attend the conference and freely download the conference material.

The authorization to download conference material is information (e.g. TRUE/FALSE) indicating whether to authorize the downloading of the conference material at times other than during the conference. The authorization to change presenter is information (e.g. TRUE/FALSE) indicating whether a presenter can be changed during the conference. A presenter (operator) is capable of switching pages of the conference material, drawing handwritten notes on the conference material, and applying such operations on the display of all client terminals 13 attending the conference.

The conference status expresses one of three statuses including before conference, during conference, and after conference. The conference status is an item set by the conference server 11, and is changed by the conference server 11 according to the current status. When a conference is newly created, the conference status is set to "before conference". When the conference begins, the conference status is set to "during conference". When all attendees of the conference leave the conference and the conference ends, the conference status is set to "after conference". The conference material indicates binary data of the document (conference material) used in the conference.

FIGS. 5-7 illustrate examples of instructions prepared in the conference server 11. In the conference system 1, XMPP is used for establishing communications between the conference server 11 and the client terminal 13. As illustrated in FIGS. 5-7, a request from the client terminal 13 to the conference server 11 is sent by an iq message and a presence message of XMPP. The client terminal 13 acquires information by a response to the request made to the conference server 11.

FIG. 5 illustrates a request message and a response message when creating a conference, editing a conference, and deleting a conference. FIG. 6 illustrates a request message and a response message when searching the conference information and holding/attending a conference. FIG. 7 illustrates a request message and a response message when leaving a conference, acquiring a material URL, and adding a material URL.

When a request message as illustrated in FIGS. 5-7 is received, the conference server 11 applies information of the request message to the conference information in the database server 12. Furthermore, by sending the response message as illustrated in FIGS. 5-7 to the client terminal 13, the conference server 11 sends information to the client terminal 13.

For example, when a password is included in the requested message for creating a conference, the conference server 11 sets a password in the conference information. When a password is set in the conference information for a conference, it is not possible to hold/attend this conference unless a correct password is included in the request for holding/attending the conference.

For example, when a request message for holding a conference including a correct password is received, the conference server 11 creates a conference room (room) of XMPP. By entering the created conference room, the client terminal 13 of the user can attend the conference.

In the following, exemplary processes that may be executed during a conference in the conference system 1 are described. The presenter may perform various actions with respect to the client terminal 13 such as specifying a page to be displayed, adding a figure, deleting a figure, updating handwritten notes, or displaying a trace mark, for example.

The client terminal 13 of the presenter generates an XMPP message according to the action performed by the presenter and sends the generated XMPP message directly to the conference server 11 or via the web server 10.

Upon receiving the XMPP message by group chat, the conference server 11 sends the XMPP message to the client terminals 13 of all users that are attending the conference room provided by group chat. The client terminals 13 that receive the XMPP message read the XMPP message and update their screen displays according to the received XMPP message.

FIG. 8 illustrates examples of a XMPP message. In FIG. 8, as examples of a XMPP message, data formats of a message specifying a display page, a message for adding a figure, a message for deleting a figure, a message for updating handwritten notes, and a trace display message are illustrated.

Group chat in XMPP is performed in units of conference rooms (rooms). When a XMPP message is sent by group chat, as indicated below, "groupchat" is specified as the "type" attribute of a <message type> tag. Furthermore, as the "from" attribute, the sender is specified. As the "to" attribute, the conference room is specified. In the <body> tag, content of the message is specified.

<message from="alice@wonderland.lit/rabithole"
    to="teaparty@conference.wonderland.lit"
    type="groupchat">
<body>March Hare: There's PLENTY of rooms!</body>
</message>

The <message> tag is a standardized specification, and therefore detailed descriptions thereof are omitted.

In the conference system 1 according to the present embodiment, in order to synchronize the display of the display page of the conference material, figures, handwritten notes, and trace marks at the client terminals 13, XML data defined in the conference system 1 is embedded in the <body> tag of the XMPP message.

In the XML data, a <conference> tag is used as the route element, and as an "operation" attribute for adding additional information to the route element, values such as "update", "add", and "delete" are specified.

In the message specifying a display page, the display page is specified by a  tag so that the display page may be shared by the client terminals 13 in a case where the material used in the conference (conference material) includes a plurality of pages.

Furthermore, in the message for adding a figure, the figure data of the figured to be added is specified by an <autoshape> tag so that the figure added by a certain client terminal 13 may be shared with the client terminals 13. As the "id" attribute of the <autoshape> tag, an identifier of the figure is specified. As the "x" and "y" attributes, the top left position (e.g. coordinates) of the figure is specified. Inside the <autoshape> tag, the figure is defined using SVG (Scalable Vector Graphics) data.

SVG is a vector graphic language described in XML and is recommended as an open standard by W3C (World Wide Web Consortium). When adding a new figure, the value "add" is specified as the "operation" attribute, and the figure to be added is defined by an <autoshape> tag and SVG data. The following is an example of SVG data.

```
<svg width="5cm" height="4cm" version="1.1"
    xmlns="http://www.w3.org/2000/svg">
    <desc>Four separate rectangles</desc>
        <rect x="0.5cm" y="0.5cm" width="2cm"
height="1cm"/>
        <rect x="0.5cm" y="2cm" width="1cm"
height="1.5cm"/>
        <rect x="3cm" y="0.5cm" width="1.5cm"
height="2cm"/>
        <rect x="3.5cm" y="3cm" width="1cm"
height="0.5cm"/>
        <rect x=".01cm" y=".01cm" width="4.98cm"
height="3.98cm"
            fill="none" stroke="blue" stroke-
width=".02cm" />
</svg>
```

Furthermore, in the message for deleting a figure, the value "delete" is specified as the "operation" attribute, and the figure to be deleted is specified in the <autoshape> tag. In the illustrated example, the figure to be deleted is specified by an "id" attribute in the <autoshape> tag.

Furthermore, in the message for updating handwritten notes, handwritten notes data is specified by an <ink> tag so that the handwritten notes added by a certain client terminal 13 may be shared with the client terminals 13. As the <ink> tag, a data format in InkML is used. InkML is for describing handwritten data using XML data, and a recommended specification thereof is provided by W3C. The following is an example of InkML data.

```
<ink xmlns="http://www.w3.org/2003/InkML"
    documentID="abcdefg123">
```

-continued

```
<definitions>
    <brush xml:id="br1">
        <brushProperty name="color" value="#000000"/>
        <brushProperty name="width" value="6"
units="dev"/>
    </brush>
    <brush xml:id="br2">
        <brushProperty name="color" value="#FF0000"/>
        <brushProperty name="width" value="20"
units="dev"/>
    </brush>
</definitions>
<trace brushRef="#br1" xml:id="tr1">90 89, 91 90,
93 95, 97 101, 103 110, 111 120, 119 129</trace>
<trace brushRef="#br2" xml:id="tr2">234 365, 236
363, 239 359, 242 357, 245 354, 249 351</trace>
</ink>
```

It is assumed that the handwritten notes in the conference material is expressed by a single InkML data item. When updating the handwritten notes, the value "update" is specified as the "operation" attribute.

The trace display message is used for drawing (displaying), for a predetermined drawing duration time, a trace mark added by a certain client terminal 13 in a manner similar to the case where handwritten notes are added, and automatically deleting the drawing (display) thereafter. In the trace display message illustrated in FIG. 8, a <duration time> tag is added to the message for updating handwritten notes described above. The <duration time> tag represents the drawing duration time for displaying the trace mark. The trace mark is automatically deleted after the drawing duration time elapses from the time the trace mark is drawn.

According to an aspect of the present embodiment, a trace display message may be created by adding the <duration time> tag to the message for updating (adding) handwritten notes, and by using such trace display message, a trace mark that is displayed may be automatically deleted after a predetermined drawing duration time elapses.

Note that the presenter (operator) operating the client terminal 13 may indicate whether to draw (input) handwritten notes or a trace mark using a menu or controls, for example, before performing the drawing operation. In this way, the conference system 1 may make the distinction between an operation for drawing handwritten notes and a trace drawing operation, for example. Also, the drawing duration time may be set up and changed via the client terminal 13 or a prescribed value may be set up at the conference system 1.

<<Handwritten Notes and Trace Mark>>

In the following, operations for drawing handwritten notes and trace marks are described in greater detail.

Figure 9:
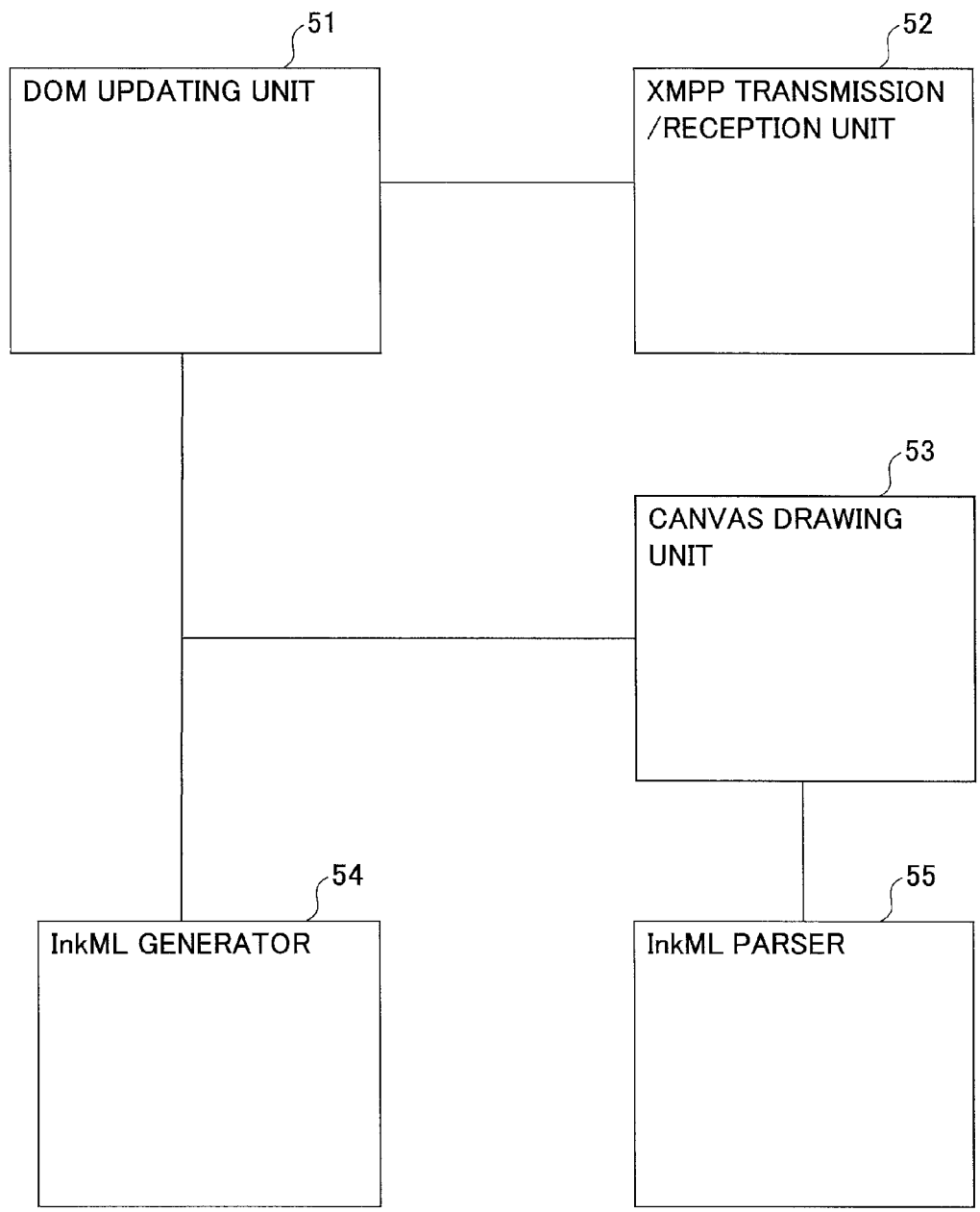
FIG. 9 is a block diagram illustrating exemplary functional features of a client terminal.

FIG. 9 is a functional block diagram illustrating exemplary functional features of the client terminal 13. Note that illustrations of functions of the client terminal 13 that are not particularly relevant to the following descriptions are omitted in FIG. 9. The functional features illustrated in FIG. 9 may be implemented by a program executed by a JavaScript engine of the web browser 21, for example. Also, the functional features illustrated in FIG. 9 may be implemented by the dedicated software 22, for example. In FIG. 9, the client terminal 13 includes a DOM updating unit 51, a XMPP transmission/reception unit 52, a canvas drawing unit 53, an InkML generator 54, and an InkML parser 55. In the following descriptions, it is assumed that these functional units are implemented by programs executed by the JavaScript engine of the web browser 21.

The DOM updating unit 51 includes a function of updating a DOM structure of a HTML file and a function of processing an event at the web browser 21. The DOM updating unit 51 updates the DOM structure according to a command included in an XMPP message or an event occurring in the web browser 21, for example, and applies the update on the display of the web browser 21. Note that the function of applying the update of the DOM structure on the display of the web browser 21 is a standard function of web browsers.

The function of updating the DOM structure of a HTML file or processing an event occurring in the web browser 21 may be implemented with ease by using jQuery, for example. jQuery is a JavaScript library released in January 2006 at BarCamp NYC by John Resig, and is a an open source software.

The XMPP transmission/reception unit 52 transmits and receives an XMPP message using XMPP on HTTP. Upon receiving an XMPP message, the XMPP transmission/reception unit 52 passes the received XMPP message to the DOM updating unit 51 to prompt the DOM updating unit 51 to update the DOM structure of a HTML file.

The canvas drawing unit 53 is configured to draw SVG data of a figure and draw InkML data of a trace in a <canvas> tag using JavaScript as described below.

The canvas drawing unit 53 passes the InkML data to the InkML parser 55 to draw the trace represented by the InkML data. The InkML parser 55 converts the received InkML data into a data structure that can be interpreted by the canvas drawing unit 53, and returns the converted data to the canvas drawing unit 53.

When the user issues an instruction to draw handwritten notes or a trace mark via the web browser 21, the DOM updating unit 51 catches the event corresponding to the instruction. The canvas drawing unit 53 draws information on the canvas according to the event. The canvas drawing unit 53 prompts the generation of InkML data by sending coordinates data, for example, to the InkML generator 54. The XMPP transmission/reception unit 52 transmits the generated InkML data in an XMPP message as a message for updating handwritten notes or a trace display message.

When the user issues an instruction to draw a figure via the web browser 21, the DOM updating unit 51 catches the event corresponding to the instruction. The canvas drawing unit 53 draws information on the canvas according to the event. The canvas drawing unit 53 generates SVG data using the toDataURL method of the canvas. The XMPP transmission/reception unit 52 transmits the generated SVG data in an XMPP message as a message for adding a figure. When a message for deleting the figure is issued, the XMPP transmission/reception unit 52 transmits the message for deleting the figure.

Figure 10:
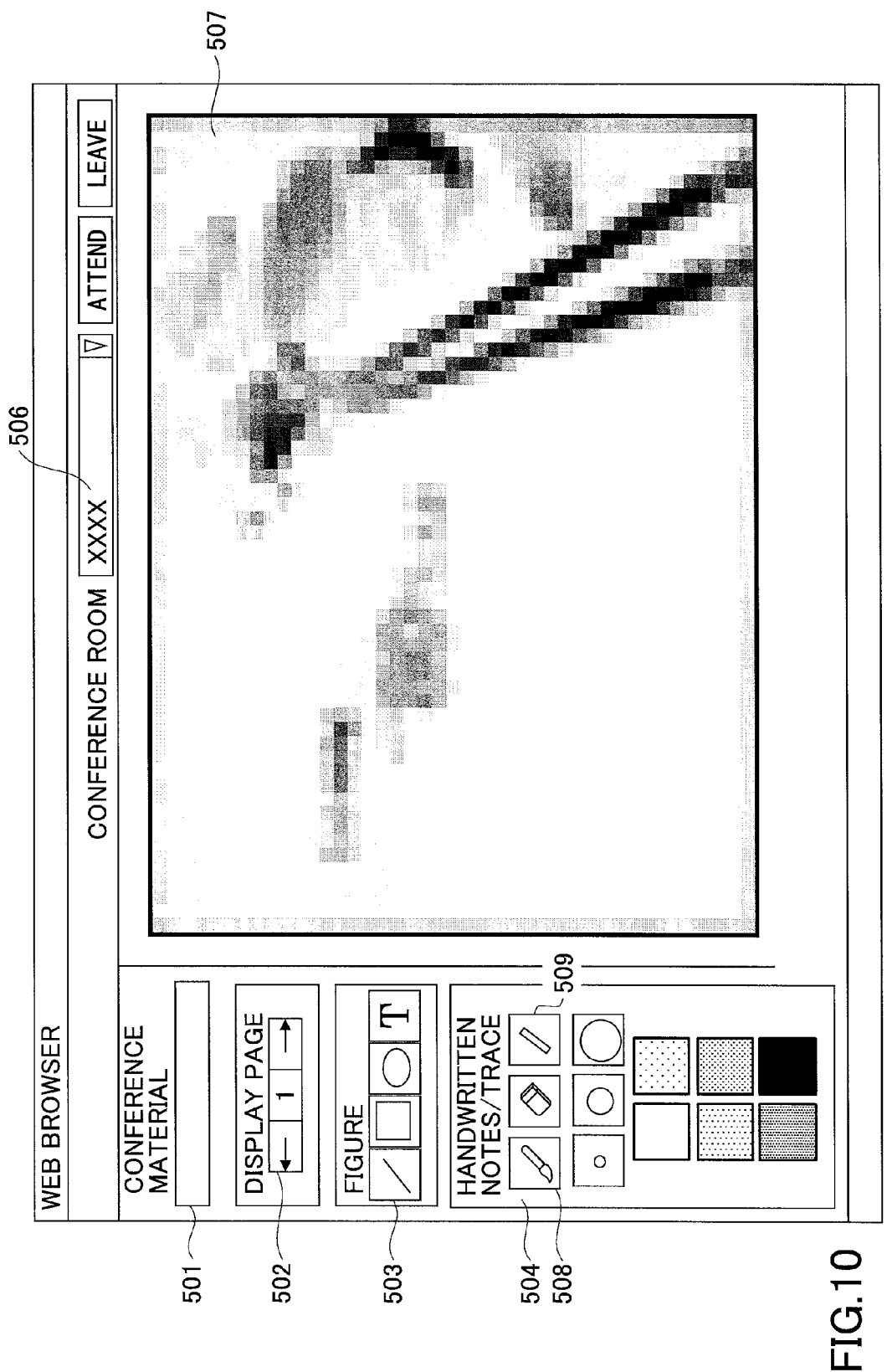
FIG. 10 illustrates an exemplary screen image displayed by a web browser.

FIG. 10 illustrates an exemplary screen image of the web browser 21. For example, a GUI (graphic user interface) of the conference system 1 at the client terminal 13A may be implemented by a screen as illustrated in FIG. 10 rendered by the web browser 21. The screen rendered by the web browser 21 is dynamically updated using the Ajax technology as described above.

The screen of FIG. 10 includes a pull-down menu 506 for selecting a conference room. An "ATTEND" button and a "LEAVE" button are provided at the right side of the pull-down menu 506 for attending or leaving a conference room provided by XMPP.

When a HTML file is loaded, the web browser 21 performs anonymous login according to the XMPP specification and acquires a list of conference rooms (rooms). The web browser 21 arranges the acquired list of conference rooms into a drop-down list to be displayed at the pull-down menu 506.

The user selects a desired conference room from the drop-down list of the pull-down menu 506 and presses the "ATTEND" button. When the "ATTEND" button is pressed, the web browser 21 transmits an XMPP message for enabling the user to attend the selected conference room. Note that the XMPP message for attending a conference room has a standard specification. When the user presses the "LEAVE" button while attending a conference room, the user may leave the conference room. When the "LEAVE" button is pressed, the web browser 21 transmits an XMPP message for enabling the user to leave the conference room that the user is attending. Note that the XMPP message for leaving a conference room has a standard specification.

The screen of FIG. 10 also includes an entry field 501 for entering a URL specifying a conference material. The web browser 21 generates an XMPP message specifying the conference material based on the URL entered in the entry field 501 and transmits the generated XMPP message. The web browser 21 acquires a file such as an HTML file from the URL entered in the entry field 501 and displays the acquired file at a display field 507.

The screen of FIG. 10 further includes a selection field 502 for selecting a page of the conference material to be displayed. For example, when a right arrow button of the selection field 502 is pressed by the user, the web browser 21 displays a next page of the conference material. When a left arrow button of the selection field 502 is pressed by the user, the web browser 21 displays a previous page of the conference material. Then, the web browser 21 generates an XMPP message specifying the displayed page and transmits the generated XMPP message.

The screen of FIG. 10 further includes a selection field 503 for selecting a figure to be added. For example, the user may select a button representing a desired figure from the selection field 503 and specify a start point and an end point on the display field 507 by clicking a mouse or touching the screen. In this way, the desired figure may be added and displayed at the display field 507. In FIG. 10, buttons representing a line, a quadrangle, an oval, and text are illustrated as examples of figures that may be added. Note that the manner of specifying the start point and end point of the figure may vary depending on the device used as the client terminal 13 by the user. For example, in a case where a PC is used as the client terminal 13, the user may use a mouse. In a case where a tablet terminal is used as the client terminal 13, the user may touch the screen to specify the start point and end point of the figure.

In a case where the button representing text as a figure to be added is pressed, the web browser 21 may prompt the user to select a desired region and input text into the selected region. The web browser 21 generates SVG data using JavaScript based on the user operation for adding a figure. The web browser 21 then generates an XMPP message for adding a figure and transmits the generated XMPP message.

In the case of deleting a figure that has been added and displayed at the display field 507, the user may right-click or long-press the relevant figure to prompt the display of a menu. When the menu is displayed, the user may select a delete option from the menu to delete the figure from the display field 507. When the figure displayed at the display field 507 is right-clicked or long-pressed, the web browser 21 may prompt the display of the menu.

When the user selects the delete option from the menu, the web browser 21 deletes the right-clicked or long-pressed figure from the display field 507. Then, the web browser 21 generates an XMPP message for deleting the figure and transmits the generated XMPP message.

The screen of FIG. 10 also includes a selection field 504 for selecting drawing options including addition of handwritten notes, deletion of handwritten notes, and trace display. The selection field 504 includes buttons representing addition of handwritten notes, trace display, an eraser, different brush sizes, and different brush colors, for example, and the user may press a desired button from the selection field 504 to select the addition of handwritten notes, the trace display, the eraser, the brush size, and the brush color. In the selection field 504 of FIG. 10, a button 508 for selecting the addition of handwritten notes, a button 509 for selecting trace display, and a button representing an eraser are provided at a top row. Further, three buttons representing three different brush sizes are provided in the middle of the selection field 504 of FIG. 10, and six buttons representing six different brush colors are provided at the bottom.

For example, when the user selects the button 508 for selecting the addition of handwritten notes or the button 509 for selecting trace display, the user may point to a given position on the display field 507 by pressing a mouse button or touching the screen. The user may keep pressing the mouse button or touching the screen while moving the position on the display field 507. When the user finally lets go of the mouse button or separates his/her finger from the screen, for example, coordinates corresponding to the movement are recorded at predetermined sampling intervals, and in this way, a line connecting the coordinates is drawn on the display field 507 as handwritten notes or a trace mark.

The web browser 21 draws handwritten notes or a trace mark by connecting the coordinates recorded at predetermined sampling intervals. The web browser 21 also generates InkML data of the handwritten notes or trace mark using JavaScript, generates an XMPP message for updating the handwritten notes or displaying the trace mark, and transmits the generated XMPP message.

When the user presses the button representing the eraser from the selection field 504, the user may erase a certain trace of the handwritten notes by moving a pointer (e.g. mouse cursor, finger) across the trace, for example.

In response to the user operation of erasing a trace by moving a pointer across the stroke of the handwritten notes drawn on the display field 507, the web browser 21 deletes the relevant trace from the display field 507. The web server 21 also deletes the trace from the InkML data of the handwritten notes using JavaScript, generates an XMPP message for updating the handwritten notes, and transmits the generated XMPP message.

In the HTML file, the display field 507 is described by three tags. The three tags may be implemented using HTML5 canvas, for example. HTML5 was released in 2008 by the W3C as a candidate recommendation (draft), and is widely supported by recent web browsers. Alternatively, the three tags may be implemented by Flash, for example.

The three tags are arranged to be the same size and are layered using CSS (Cascading Style Sheets). For example, the lowermost tab may be an <img> tag for displaying the image of the conference material. The second tag may be a <canvas> tag for drawing a figure. The third tag may be a <canvas> tag for drawing handwritten notes and trace marks.

The <canvas> tag of HTML5 enables drawing figures using JavaScript. By using the <canvas> tag, handwritten notes and trace marks may be easily drawn by a JavaScript mouse event or a JavaScript touch event, for example. Also, the <canvas> tag of HTML5 enables the drawing of figures such as a line, a quadrangle, or an oval as well as conversion of the figure into SVG data using the toDataURL method.

Upon receiving an XMPP message by group chat, the web browser 21 analyzes the XMPP message. If the XMPP message corresponds to a message specifying a conference material, the web browser 21 downloads the relevant conference material, and displays an image of the first page of the conference material at the <img> tag corresponding to the lowermost tag.

If the XMPP message corresponds to a message specifying a display page, the web browser 21 displays the specified display page at the <img> tag. If the XMPP message corresponds to a message for adding a figure, the web browser 21 draws the figure defined by SVG data in the <canvas> tag corresponding to the second tag. If the XMPP message corresponds to a message for deleting a figure, the web browser 21 deletes the figure having a matching "id" attribute from the <canvas> tag corresponding to the second tag. If the XMPP message corresponds to a message for adding handwritten notes, the web browser 21 draws the handwritten notes in the <canvas> tag corresponding to the third tag based on InkML data.

If the XMPP message corresponds to a trace display message, the web browser 21 draws the trace mark in the <canvas> tag corresponding to the third tag based on InkML data. Also, the web browser 21 deletes the trace mark after a predetermined drawing duration time elapses.

Note that in certain embodiments, authorizations to specify a conference material, select a page, add/delete a figure, update handwritten notes, and display a trace mark via the screen as illustrated in FIG. 10 may be set up with respect to each user, for example.

Figure 11:
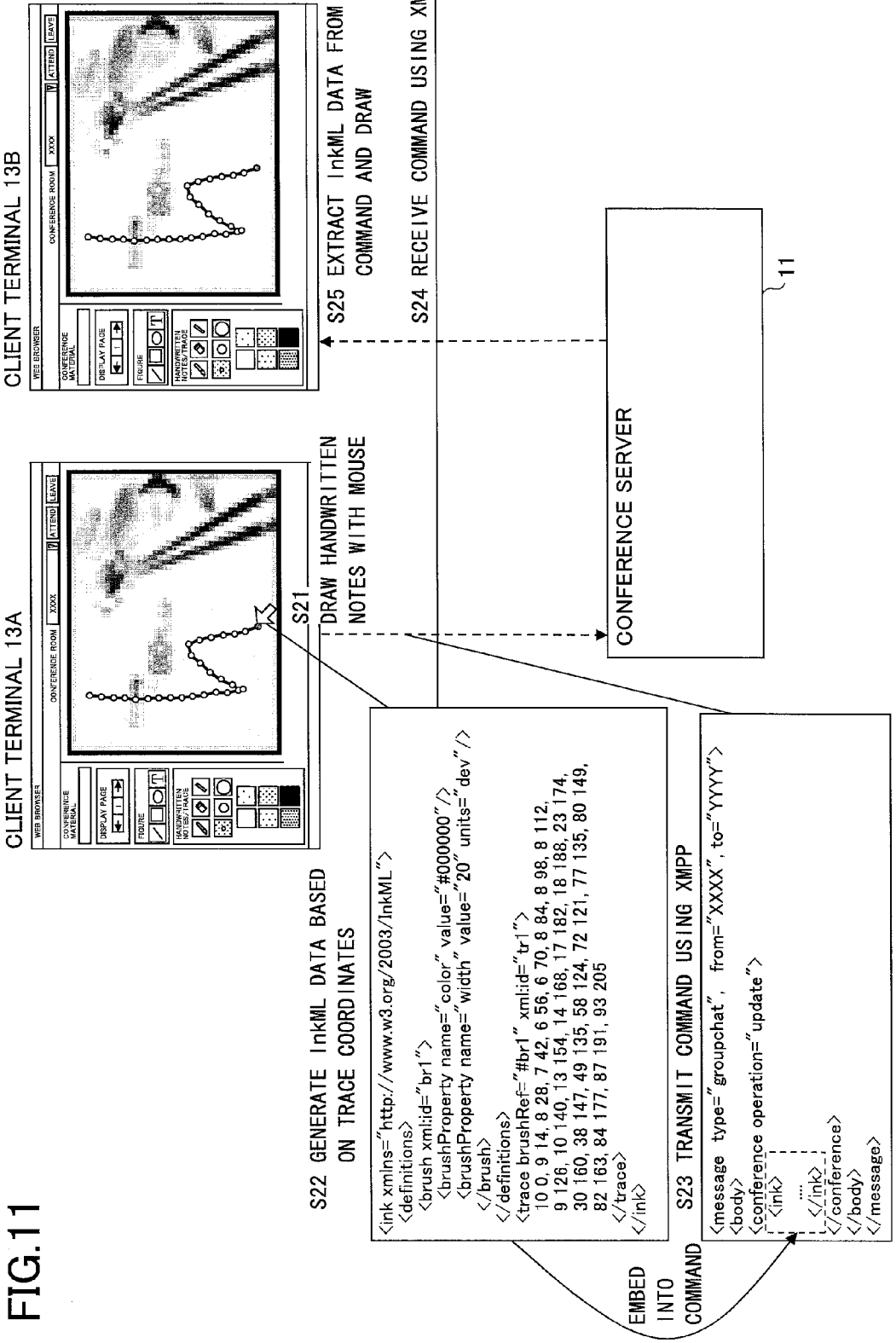
FIG. 11 illustrates an exemplary display updating process implemented in the conference system.

In the following, an exemplary process flow is described in which handwritten notes drawn at a given client terminal 13A is shared with another client terminal 13B by updating its display. FIG. 11 illustrates an exemplary display updating process implemented in the conference system 1 of the present embodiment.

In step S21, the user draws handwritten notes on a screen of the client terminal 13A by drawing a trace using a mouse, for example. In turn, the web browser 21 of the client terminal 13A records the coordinates of the trace drawn by the user at predetermined sampling intervals and connects the coordinates by a line to draw one trace of the handwritten notes.

In step S22, the web browser 21 generates InkML data of the handwritten notes using JavaScript based on the coordinates of the trace drawn by the user. In step S23, the web browser 21 embeds the InkML data generated in step S22 into an XMPP message and transmits the XMPP message to the conference server 11 by group chat.

Upon receiving the XMPP message by group chat, in step S24, the conference server 11 distributes the XMPP message to the client terminal 13B that is attending the group chat conference room. In step S23, the dedicated software 22 of the client terminal 13B extracts the InkML data embedded in the XMPP message. The dedicated software 22 can then draw a trace similar to that drawn on the screen of the client terminal 13A on the screen of the client terminal 13B based on the extracted InkML data.

In the exemplary case of drawing handwritten notes as illustrated in FIG. 11, the XMPP message is transmitted in units of one stroke where one stroke corresponds to one trace that may be drawn by the user by keeping a mouse button pressed or maintaining contact with the screen while moving a point along the screen, for example. On the other hand, in the case of trace display, if the XMPP message is transmitted in units of one stroke, a trace corresponding to one stroke may suddenly appear on the screen, and the entire stroke may disappear after a predetermined drawing duration time elapses. This may bring about a sense of abruptness to the user.

Accordingly, in the case of trace display according to the present embodiment, rather than transmitting the XMPP message in units of one stroke, one data unit containing a few sets of coordinates (e.g., 2-3 sets of coordinates) is sequentially transmitted. In this way, the client terminal receiving the XMPP message (e.g. client terminal 13B) may sequentially draw and delete the trace in units of one data. That is, in the present embodiment, a trace is sequentially drawn in units of one data, and the drawn trace is sequentially deleted in units of one data after the drawing duration time elapses to avoid giving a sense of abruptness to the user.

Figure 12:
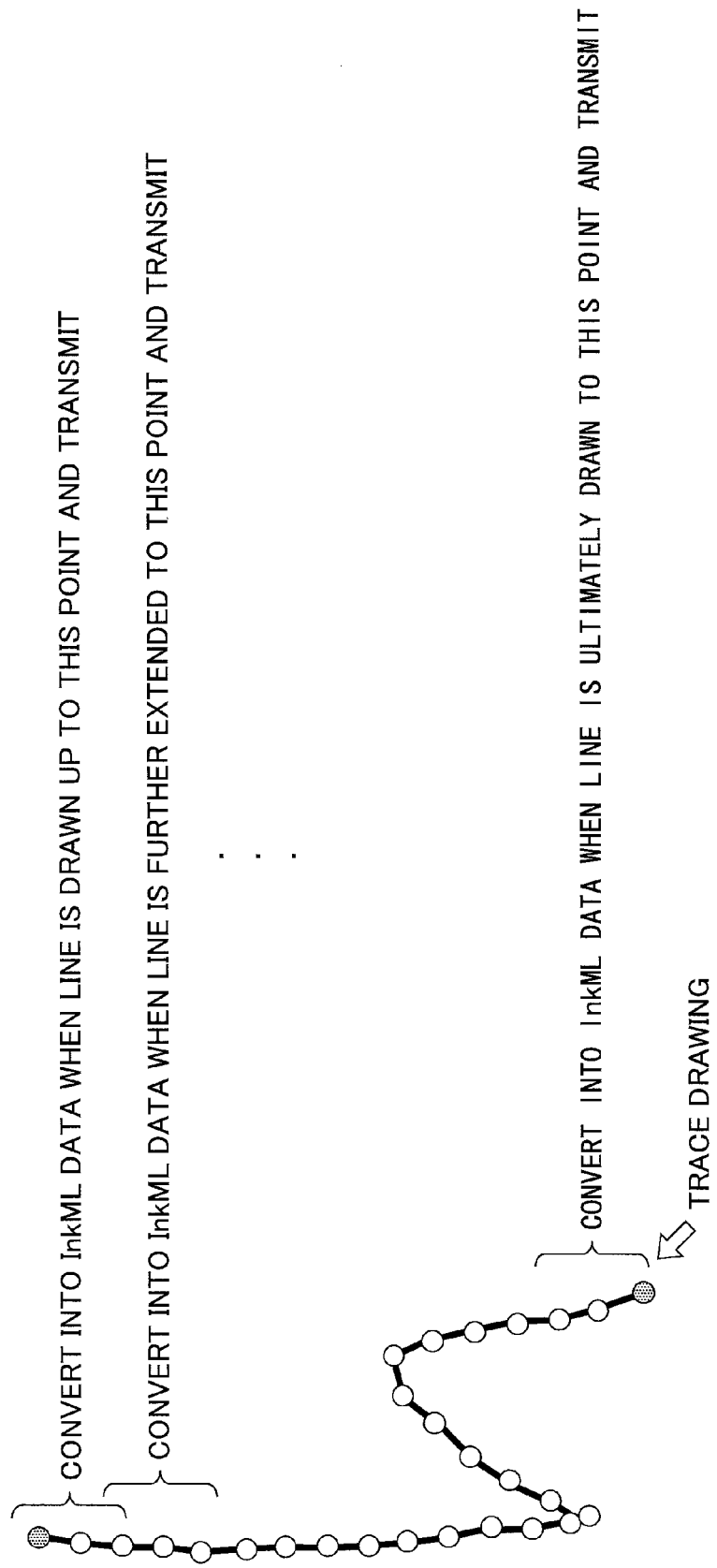
FIG. 12 illustrates an exemplary manner of subdividing and transmitting a trace corresponding to one stroke.

FIG. 12 illustrates an exemplary manner of subdividing and transmitting data of a trace corresponding to one stroke. In the example illustrated in FIG. 12, one data unit containing three sets of coordinates is sequentially transmitted by an XMPP message. As illustrated in FIG. 12, the data units after the first data unit include the coordinates of the last point of an immediately preceding data unit as a starting point. In this way, the client terminal sequentially receiving the XMPP message (client terminal 13B) may seamlessly draw and display the trace.

Figure 13:
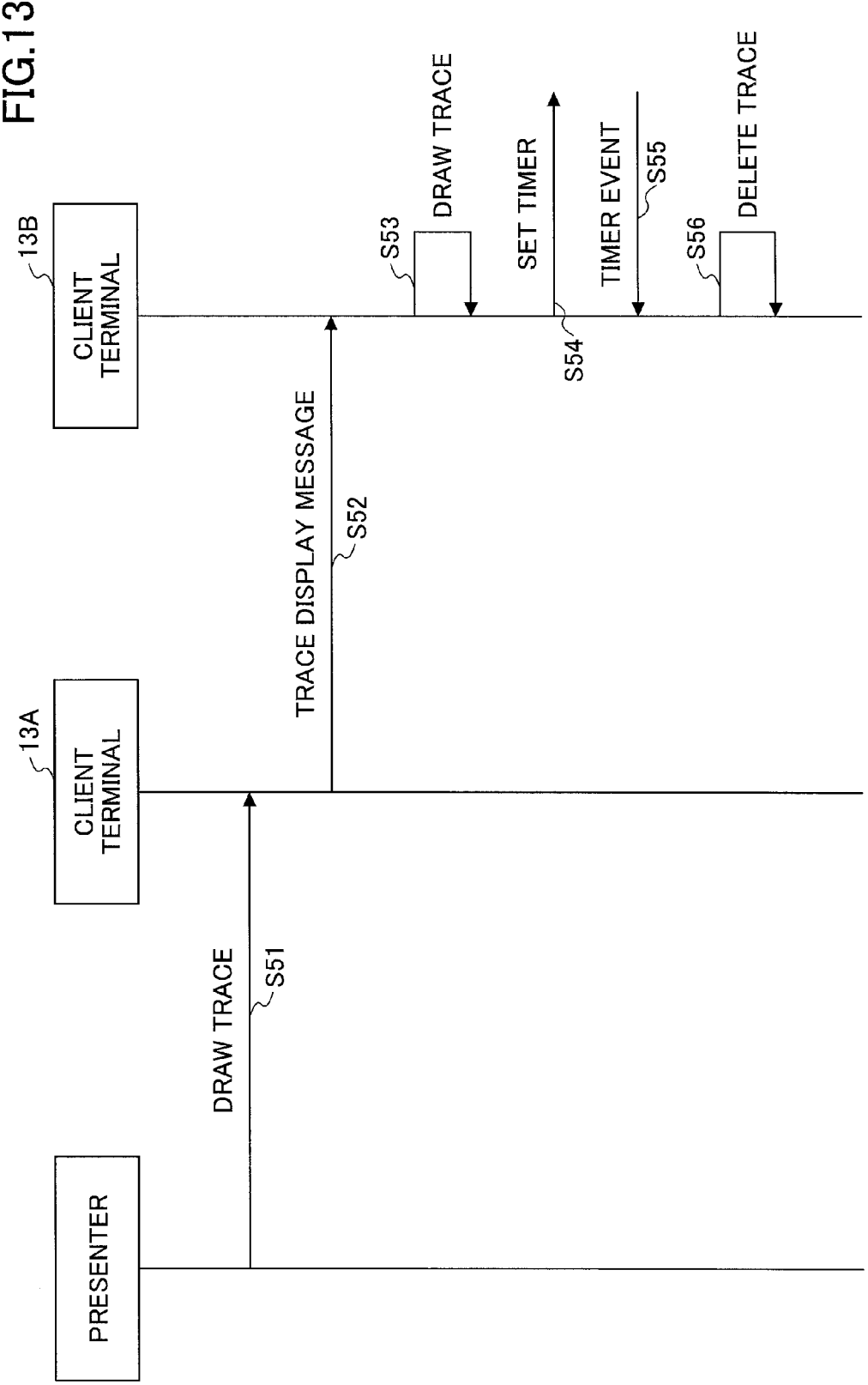
FIG. 13 is a sequence chart illustrating exemplary process steps of a trace display process implemented in the conference system.

FIG. 13 is a sequence chart illustrating an exemplary trace display process implemented in the conference system 1 according to the present embodiment. In step S51, the user draws a trace mark on the screen of the client terminal 13A by drawing a trace using a mouse, for example. In turn, the web browser 21 of the client terminal 13A records the coordinates of the trace drawn by the user at predetermined sampling intervals, and connects the coordinates by a line to draw the trace.

In step S52, the web browser 21 generates InkML data of the trace using JavaScript based on the coordinates of the trace drawn by the user. Note that the InkML data generated in step S52 correspond to data units each representing a few coordinates of the coordinates of one stroke of the trace mark as described above. Accordingly, the processes of step S52 and steps executed thereafter are repeated until the coordinates of one stroke of the trace mark are transmitted as the InkML data to the client terminal 13B.

The web browser 21 embeds the generated InkML data into a trace display message (XMPP message) and transmits the trace display message to the client terminal 13B via the conference server 11 by group chat. The conference server 11 receives the XMPP message from the client terminal 13A and distributes the XMPP message to the client terminal 13B that is attending the group chat conference room.

In step S53, the dedicated software 22 of the client terminal 13B extracts the InkML data embedded in the trace display message. The dedicated software 22 can then draw a trace similar to that drawn on the screen of the client terminal 13A on the screen of the client terminal 13B based on the extracted InkML data.

In step S54, the dedicated software 22 of the client terminal 13B reads the drawing duration time from the <duration time> tag of the trace display message and sets a timer for the drawing duration time. In step S55, the dedicated software 22 of the client terminal 13B is notified by the timer of an event indicating the elapse of the drawing duration time. In step S56, the dedicated software 22 of the client terminal 13B deletes the relevant trace that has been displayed for the drawing duration time.

Figure 14:
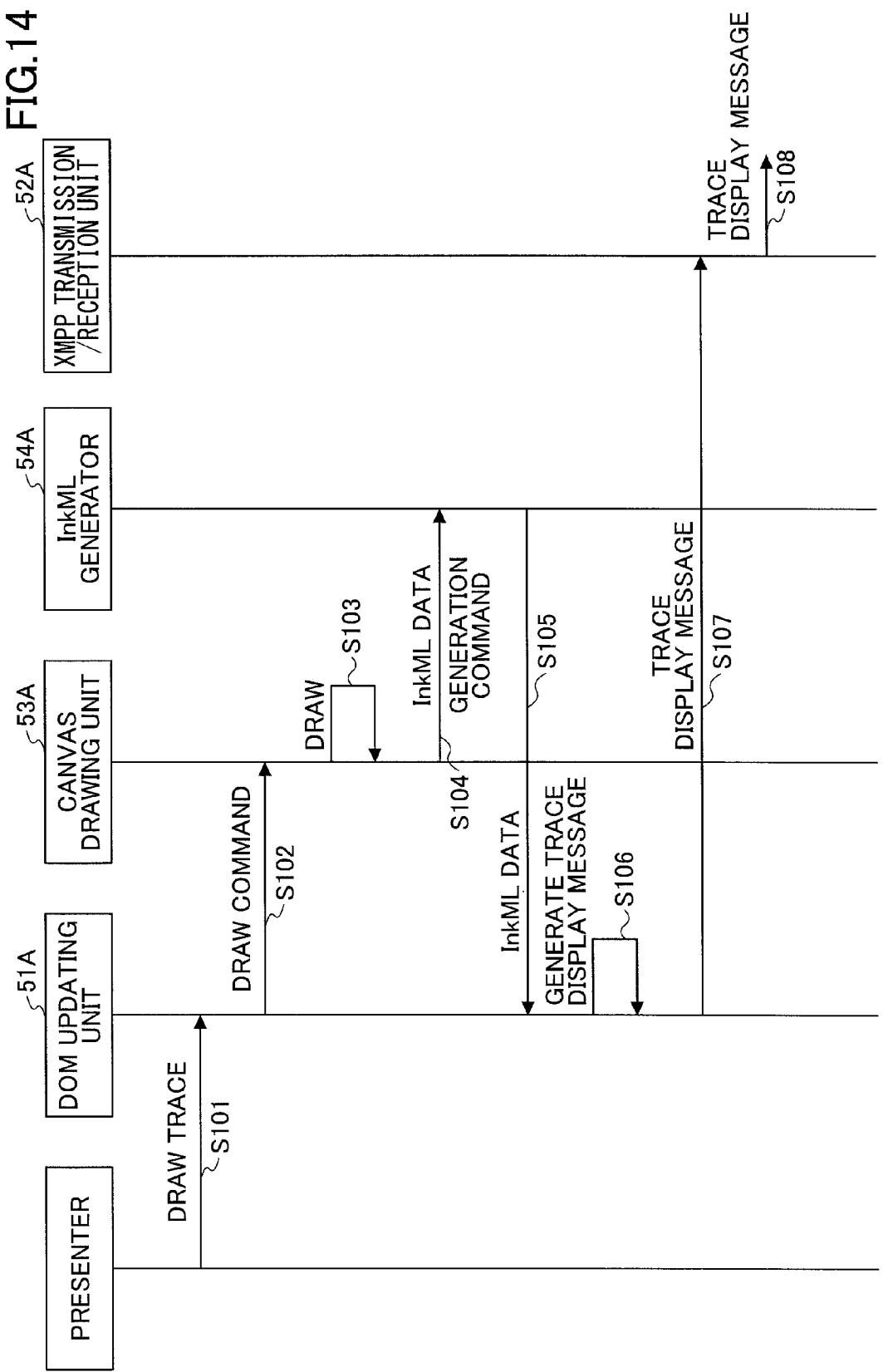
FIG. 14 is a sequence chart illustrating exemplary process steps of a trace display process executed by a transmission side client terminal of the conference system.

FIG. 14 is a sequence chart illustrating an exemplary trace display process of a transmission side client terminal of the conference system 1 according to the present embodiment. In step S101, the user draws a trace mark on the screen of the client terminal 13A corresponding to the transmission side client terminal by drawing a trace using a mouse, for example.

In step S102, the DOM updating unit 51A of the client terminal 13A sends a drawing command to the canvas drawing unit 53A to draw the trace mark. In step S103, the canvas drawing unit 53A draws the trace mark by recording the coordinates of the trace drawn by the user at predetermined sampling intervals and connecting the coordinates by a line.

In step S104, the canvas drawing unit 53A sends a InkMl data generation command to the InkML data generator 54A. In turn, the InkML generator 54A generates the InkML data of the trace mark based on the coordinates of the trace drawn by the user. In step S105, the InkML generator 54 passes the generated InkML data to the DOM updating unit 51A.

In step S106, the DOM updating unit 51A generates a trace display message having the InkML data embedded therein. The trace display message generated in step S106 includes the <duration time> tag. In step S107, the DOM updating unit 51A passes the trace display message to the XMPP transmission/reception unit 52A. In step S108, the XMPP transmission/reception unit 52A transmits the trace display message to the client terminal 13B via the conference server 11 by group chat.

Figure 15:
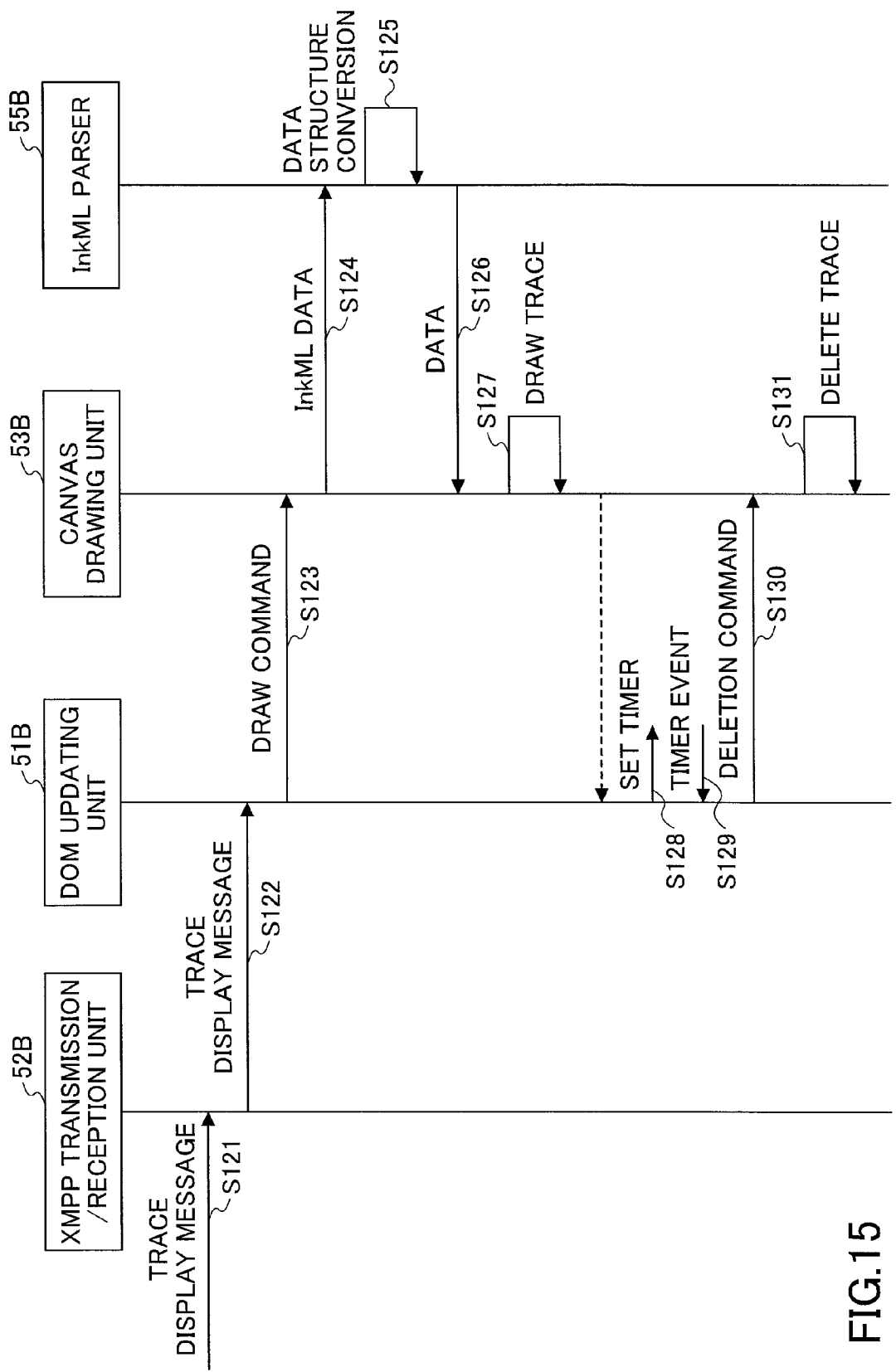
FIG. 15 is a sequence chart illustrating exemplary process steps of a trace display process executed by a receiving side client terminal of the conference system.

FIG. 15 is a sequence chart illustrating an exemplary trace display process of a receiving side client terminal of the conference system 1 according to the present embodiment. In step S121, the XMPP transmission/reception unit 52B of the client terminal 13B corresponding to the receiving side client terminal receives the trace display message. In step S121, the XMPP transmission/reception unit 52B passes the received trace display message to the DOM updating unit 51B.

In step S123, the DOM updating unit 51B extracts the InkML data embedded in the trace display message. The DOM updating unit 51B sends a drawing command including the extracted InkML data to the canvas drawing unit 53B. In step S124, the canvas drawing unit 53B passes the InkML data to the InkML parser 55B. In step S125, the InkML parser 55B converts the InkML data into a data structure that can be interpreted by the canvas drawing unit 53B. In step S126, the InkML parser 55B returns the converted data to the canvas drawing unit 53B.

In step S127, the canvas drawing unit 53B draws a trace similar to that drawn on the screen of the client terminal 13A on the screen of the client terminal 13B based on the data returned from the InkML parser 55B.

In step S128, the DOM updating unit 51B of the client terminal 13B reads the drawing duration time from the <duration time> tag of the trace display message and sets a timer for the drawing time duration. In step S129, the DOM updating unit 51B is notified by the timer of an event indicating the elapse of the drawing duration time. In step S130, the DOM updating unit 51B sends a trace deletion command to the canvas drawing unit 53B. In step S130, the canvas drawing unit 53B deletes the relevant trace. In this way, the receiving side client terminal 13B may delete a trace after the drawing duration time elapses from the time the trace is displayed.

<Summary>

In the conference system 1 for sharing a conference material and synchronously displaying at the client terminals 13 a page of the conference material and handwritten notes, for example, the trace display message according to the present embodiment may be used to implement a handwriting function of displaying a handwritten trace mark and automatically deleting the handwritten trace mark after a predetermined drawing duration time elapses. By using the trace display message in the conference system 1 of the present embodiment, a presenter may use a handwriting function as a pointer function, for example. Also, by using the message for updating handwritten notes in the conference system 1 of the present embodiment, the presenter may use the handwriting function to draw handwritten notes, for example.

In the conference system 1 according to the present embodiment, the presenter may use a handwriting function as a pointer function for drawing marks at appropriate times or a pen function for handwriting notes, for example. That is, the presenter may easily handle both handwritten notes to be displayed continuously and trace marks that are automatically deleted after being displayed for a certain duration time. In this way, usability of the conference system may be improved.

Note that the trace display message of the present embodiment is created by simply adding a <duration time> tag to the message for updating handwritten notes as described above. In this way, the pointer function may be implemented with few changes.

[Second Embodiment]

In the conference system 1 according to the first embodiment, a trace display message having a <duration time> tag added to the message for updating handwritten notes is used, and the client terminal 13 receiving the trace display message displays the corresponding trace, counts (measures) the drawing duration time, and deletes the trace after the duration time elapses. In the conference system 1 according to a second embodiment, the client terminal 13A transmitting the trace display message counts the drawing duration time and transmits a trace deletion message after the drawing duration time elapses.

Note that many features of the second embodiment are identical to those of the first embodiment. Accordingly, overlapping descriptions are omitted, and features of the second embodiment that differ from the first embodiment are described below.

Figure 16:
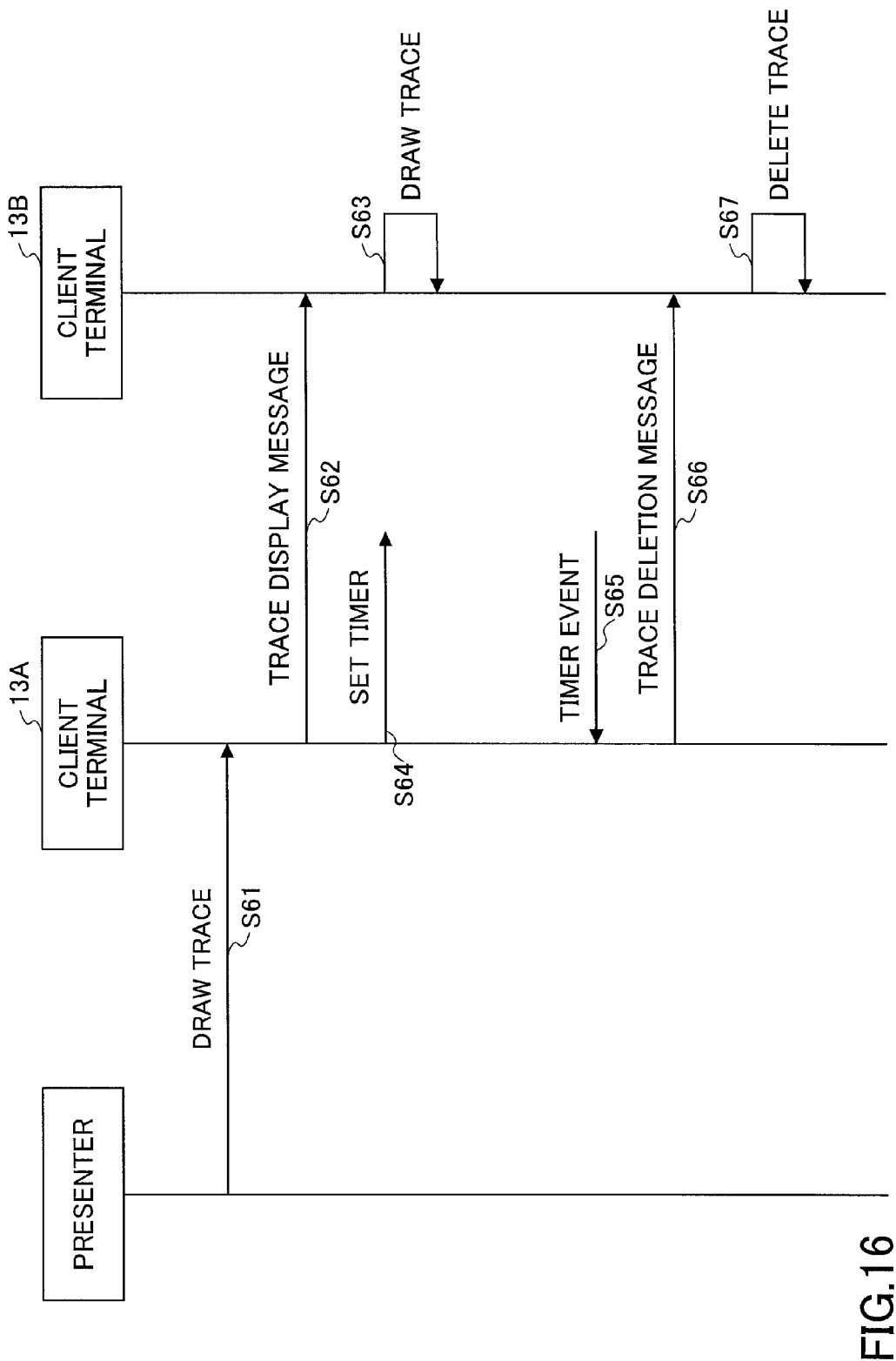
FIG. 16 is a sequence chart illustrating process steps of another exemplary trace display process that may be implemented in the conference system.

FIG. 16 is a sequence chart illustrating an exemplary trace display process implemented in the conference system 1 according to the second embodiment. Step S61 of the present trace display process is similar to step S51 of FIG. 13. In step S62, the web browser 21 of the client terminal 13A generates InkML data of the trace mark based on the coordinates of the trace drawn by the user. As in the first embodiment, the InkML data generated in step S62 correspond to data units each representing a few coordinates of the coordinates of the trace corresponding to one stroke.

Thus, the processes of step S62 and steps executed thereafter are repeated until all the coordinates of the trace corresponding to one stroke are transmitted as InkML data to the client terminal 13B and corresponding trace deletion messages (described below) are transmitted to the client terminal 13B.

The web browser 21 of the client terminal 13A embeds the generated InkML data in a trace display message and transmits the trace display message to the client terminal 13B via the conference server 11 by group chat. Note that the trace display message transmitted in the second embodiment does not include the <duration time> tag, which is included in the trace display message of the first embodiment. That is, the trace display message of the second embodiment has a data format that is identical to that of the message for updating handwritten notes.

In step S63, the dedicated software 22 of the client terminal 13B extracts the InkML data embedded in the trace display message. The dedicated software 22 draws a trace similar to the trace drawn on the screen of the client terminal 13A on the screen of the client terminal 13B based on the extracted InkML data.

Meanwhile, in step S64, the web browser 21 of the client terminal 13A sets the timer for the drawing duration time. In step S65, the web browser 21 of the client terminal 13A is notified by the timer of an event indicating the elapse of the drawing duration time. In step S66, the web browser 21 of the client terminal 13A transmits to the client terminal 13B a trace deletion message for deleting the trace that has been displayed for the drawing duration time. For example, in the trace deletion message of the present embodiment, the value "delete" may be assigned to the "operation" attribute and the object to be deleted may be specified by InkML data. In step S67, the dedicated software 22 of the client terminal 13B that receives the trace deletion message deletes the trace that has been displayed for the drawing duration time.

<Summary>

In the conference system 1 according to the second embodiment, advantageous effects similar to those obtained in the first embodiment may be obtained without adding the <duration time> tag to the trace display message.

Note that in certain embodiments, the client terminal 13 may be able to switch between sharing mode and local mode. In sharing mode, a display of a page of a conference material or handwritten traces may be synchronized with that of the client terminal 13 of the presenter. In local mode, such synchronization is not implemented. In a case where the client terminal 13 is switched from sharing mode to local mode, a trace mark displayed on the screen of the client terminal 13 may continue to be displayed until its drawing duration time elapses, or the trace may be deleted at the time the operation mode of the client terminal 13 is switched from sharing mode to local mode (i.e. before the elapse of the drawing duration time), for example.

Also, note that the present invention is not limited to the embodiments described above, and numerous variations and modifications may be made without departing from the scope of the present invention. For example, the canvas drawing unit 53 described above is an exemplary embodiment of a drawing unit of the present invention, and the XMPP transmission/reception unit 52 is an exemplary embodiment of a transmission unit of the present invention. Also, the DOM updating unit 51 and the InkML generator 54 are exemplary embodiments of a generation unit of the present invention.

Also, the above-described conference system 1 including the web server 10, the conference server 11, and the database server 12 is merely one example of an information processing system of the present invention. That is, the present invention may be applied to various other systems configured for various uses and purposes.

Further, the present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, a personal digital assistant, a mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2013-104906 filed on May 17, 2013, the entire contents of which are hereby incorporated by reference.

What is claimed is:

1. An information processing apparatus comprising:
a memory; and
a processor coupled to the memory and configured to execute a program stored in the memory which causes the processor to function as:
a display unit configured to display content that is shared with another information processing apparatus;
an input unit configured to accept an input corresponding to a handwriting operation or a trace marking operation from an operator;
a drawing unit configured to draw handwritten information or trace mark information on the content that is being displayed based on the accepted input;
a generation unit configured to generate first message data including coordinate information for drawing the handwritten information on the content that is being displayed at the other information processing apparatus if the accepted input corresponds to the handwriting operation, and generate second message data including coordinate information for drawing the trace mark information on the content that is being displayed by the other information processing apparatus if the accepted input corresponds to the trace marking operation; and
a transmission unit configured to transmit the first message data or the second message data to the other information processing apparatus based on whether the accepted input corresponds to the handwriting operation or the trace marking operation, wherein the second message data includes information specifying that the trace mark information that is displayed on the content being displayed by the other information processing apparatus is to be deleted after being displayed for a predetermined time period;

wherein if the accepted input corresponds to the handwriting operation, the transmission unit transmits the first message data in data units of one stroke as a single message; and wherein if the accepted input corresponds to the trace marking operation, the transmission unit sequentially transmits the second message data in data units smaller than one stroke as multiple messages such that a drawn trace displayed on the content that is being displayed by the other information processing apparatus corresponding to the trace marking operation is sequentially deleted in data units of smaller than one stroke after the predetermined time period elapses.

2. The information processing apparatus as claimed in claim 1, wherein when the input accepted from the operator corresponds to the trace marking operation, the generation unit includes the predetermined time period for displaying the trace mark information in the second message data.

3. The information processing apparatus as claimed in claim 1, further comprising:
  a timer that measures time;
  wherein when the input accepted from the operator corresponds to the trace marking operation, the generation unit generates data for deleting the trace mark information drawn on the content when the timer signals the elapse of the predetermined time period.

4. The information processing apparatus as claimed in claim 1, wherein
  when the input accepted from the operator corresponds to the handwriting operation, the generation unit generates data for continuously displaying the handwritten information on the content that is being displayed at the other information processing apparatus; and
  when the input accepted from the operator corresponds to the trace marking operation, the generation unit generates data for deleting the trace mark information from the content that is being displayed at the other information processing apparatus after the predetermined time period elapses.

5. The information processing apparatus as claimed in claim 1, wherein at least one of the first message data and the second message data includes a message communicated by an instant messenger.

6. The information processing apparatus as claimed in claim 1, wherein when a mode of the information processing apparatus is switched from a mode for sharing an operation on content to a mode for not sharing the operation on the content, the generation unit generates data for deleting the trace mark information that is to be deleted after the elapse of the predetermined time period before the elapse of the predetermined time period.

7. An information processing system comprising:
  a first information processing apparatus; and
  a second information processing apparatus;
  wherein the first information processing apparatus includes:
    a first memory; and
    a first processor coupled to the first memory and configured to execute a program stored in the first memory which causes the first processor to function as:
      a display unit configured to display content that is shared with the second information processing apparatus;
      an input unit configured to accept an input corresponding to a handwriting operation or a trace marking operation from an operator;
      a first drawing unit configured to draw handwritten information or trace mark information on the content that is being displayed based on the accepted input;
      a generation unit configured to generate first message data including coordinate information for drawing the handwritten information on the content that is being displayed at the second information processing apparatus if the accepted input corresponds to the handwriting operation, and generate second message data including coordinate information for drawing the trace mark information on the content that is being displayed at the second information processing apparatus if the accepted input corresponds to the trace marking operation; and
      a transmission unit configured to transmit the first message data or the second message data to the second information processing apparatus based on whether the accepted input corresponds to the handwriting operation or the trace marking operation, wherein the second message data includes information specifying that the trace mark information that is displayed on the content being displayed at the second information processing apparatus is to be deleted after being displayed for a predetermined time period;
  wherein the second information processing apparatus includes:
    a second memory; and
    a second processor coupled to the second memory and configured to execute a program stored in the second memory which causes the second processor to function as:
      a receiving unit configured to receive the first message data or the second message data; and
      a second drawing unit configured to draw the handwritten information or the trace mark information on the content that is being displayed based on whether the first message data or the second message data is received;
  wherein if the accepted input corresponds to the handwriting operation, the transmission unit transmits the first message data in data units of one stroke as a single message; and
  wherein if the accepted input corresponds to the trace marking operation, the transmission unit sequentially transmits the second message data in data units smaller than one stroke as multiple messages such that a drawn trace displayed on the content that is being displayed by the second information processing apparatus corresponding to the trace marking operation is sequentially deleted in data units of smaller than one stroke after the predetermined time period elapses.

8. The information processing system as claimed in claim 7, wherein the second information processing apparatus further includes a deletion unit configured to delete the trace mark information from the content that is being displayed if the second message data is received.

9. The information processing system as claimed in claim 7, wherein the generation unit generates data for deleting the trace mark information drawn on the content after the predetermined time period elapses.

10. An information display method executed by an information processing system including a first information processing apparatus and a second information processing apparatus, the information display method comprising the steps of:

the first information processing apparatus displaying content that is shared with the second information processing apparatus;

the first information processing apparatus accepting an input corresponding to a handwriting operation or a trace marking operation from an operator;

the first information processing apparatus drawing handwritten information or trace mark information on the content that is being displayed based on the accepted input;

the first information processing apparatus generating first message data if the accepted input corresponds to the handwriting operation and generating second message data if the accepted input corresponds to the trace marking operation, the first message data including coordinate information for drawing the handwritten information on the content that is being displayed at the second information processing apparatus, and the second message data including coordinate information for drawing the trace mark information on the content that is being displayed at the second information processing apparatus;

the first information processing apparatus transmitting the first message data or the second message data to the second information processing apparatus based on whether the accepted input corresponds to the handwriting operation or the trace marking operation, wherein the second message data includes information specifying that the trace mark information that is displayed on the content being displayed at the second information processing apparatus is to be deleted after being displayed for a predetermined time period; and the second information processing apparatus drawing the handwritten information or the trace mark information on the content that is being displayed at the second information processing apparatus based on whether the first message data or the second message data is received;

wherein if the accepted input corresponds to the handwriting operation, the first information processing apparatus transmits the first message data in data units of one stroke as a single message; and wherein if the accepted input corresponds to the trace marking operation, the first information processing apparatus sequentially transmits the second message data in data units smaller than one stroke as multiple messages such that a drawn trace displayed on the content that is being displayed by the second information processing apparatus corresponding to the trace marking operation is sequentially deleted in data units of smaller than one stroke after the predetermined time period elapses.

11. The information processing apparatus as claimed in claim 1, wherein the transmission unit transmits the first message data or the second message data to the other information processing apparatus via a server.

\* \* \* \* \*